US012304211B2

(12) United States Patent
Takahashi et al.

(10) Patent No.: US 12,304,211 B2
(45) Date of Patent: May 20, 2025

(54) LIQUID STORAGE CONTAINER AND RECORDING APPARATUS

(71) Applicant: CANON KABUSHIKI KAISHA, Tokyo (JP)

(72) Inventors: Satoru Takahashi, Kanagawa (JP); Junichiro Iri, Kanagawa (JP); Hiroaki Kusano, Tokyo (JP); Isao Otani, Kanagawa (JP); Naruyuki Nojo, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 185 days.

(21) Appl. No.: 18/353,828

(22) Filed: Jul. 17, 2023

(65) Prior Publication Data

US 2024/0025179 A1 Jan. 25, 2024

(30) Foreign Application Priority Data

Jul. 20, 2022 (JP) ................................ 2022-115189

(51) Int. Cl.
*B41J 2/175* (2006.01)

(52) U.S. Cl.
CPC ....... *B41J 2/17513* (2013.01); *B41J 2/17553* (2013.01); *B41J 2002/17516* (2013.01)

(58) Field of Classification Search
CPC .... B41J 2/175; B41J 2/17506; B41J 2/17509; B41J 2/17513; B41J 2/1752; B41J 2/17523; B41J 2/17553; B41J 29/13; B41J 2002/17516
See application file for complete search history.

(56) References Cited

U.S. PATENT DOCUMENTS 5,400,066 A 3/1995 Matsumoto et al. ........... 347/86
2014/0362148 A1* 12/2014 Ishizawa .................. B41J 29/13
347/86
2021/0370682 A1 12/2021 Murakami et al. ........ B41J 2/75
2022/0363066 A1 11/2022 Ojima et al. ............. B41J 2/175
2022/0396089 A1 12/2022 Okuyama et al. ..... B43K 11/00
2023/0339232 A1 10/2023 Otani et al. .............. B41J 2/175
2023/0382120 A1* 11/2023 Morikawa .............. B41J 2/1752

FOREIGN PATENT DOCUMENTS

JP H04-214361 8/1992 ............. B41J 2/175

OTHER PUBLICATIONS

U.S. Appl. No. 18/319,427, filed May 17, 2023.
U.S. Appl. No. 18/324,095, filed May 25, 2023.

* cited by examiner

*Primary Examiner* — Anh T Vo
(74) *Attorney, Agent, or Firm* — Venable LLP

(57) ABSTRACT

A liquid storage container attachable to and detachable from a recording apparatus includes: a liquid storage bag that includes a supply port for supplying liquid to a port to be supplied of the recording apparatus and is configured to store liquid; an opening and closing body movable between an open position that allows liquid to be supplied from the supply port to the port to be supplied and a closed position that closes the supply port; a handle configured to move the opening and closing body between the open position and the closed position; and a lock mechanism configured to lock the opening and closing body in the closed position so as to permit the opening and closing body to move to the open position only when the liquid storage container is in an attached state in which the liquid storage container is attached to the recording apparatus.

17 Claims, 19 Drawing Sheets

LIQUID STORAGE CONTAINER AND RECORDING APPARATUS

BACKGROUND OF THE INVENTION

Field of the Invention

The present invention relates to a recording apparatus including a liquid storage container.

Description of the Related Art

As a recording apparatus that ejects recording liquid onto a recording material so that the recording liquid adheres to the recording material for recording, what is referred to as an inkjet printer is known. An inkjet printer may have a configuration including, as the supply source of ink as recording liquid to be supplied to a recording head as a recording portion, an ink tank as a liquid storage container configured to be attachable to and detachable from the apparatus main body. The configuration allows the user to easily replenish ink, which is a consumable item.

A liquid storage container of a known form stores liquid in a bag-shaped container made of a flexible film such as an aluminum laminate. Such a bag-shaped container form is easy to handle, the capacity of the container can be easily increased, and the frequency of replacement can be reduced. However, the small amount of liquid remaining in the container or near the supply port may leak when the container is replaced, contaminating the surroundings. For example, Japanese Patent Application Publication No. H04-214361 describes a recording apparatus for solving this problem. The recording apparatus disclosed in Japanese Patent Application Publication No. H04-214361 uses a lid for a liquid communication portion. The lid includes an upper plate, which is displaced in the height direction according to the amount of liquid remaining in the container, and a lower plate, which has claws for holding the upper plate when the amount of liquid remaining in the container becomes small, to limit leakage of the liquid when replacing or removing the container.

SUMMARY OF THE INVENTION

However, the configuration described in Japanese Patent Application Publication No. H04-214361 is structured so that the lid of the liquid communication portion closes when the amount of the remaining liquid becomes small. As such, it is difficult to prevent liquid leakage when the liquid storage container is removed in a situation in which the amount of the remaining liquid is not small. Additionally, when the amount of remaining liquid becomes small and the liquid communication portion is covered with the lid, the claws restrict movement of the upper and lower plates, making it difficult to reuse the container after being covered with the lid. A liquid storage container may be replaced or removed not only when the amount of remaining liquid becomes small. It is therefore desirable to prevent liquid leakage regardless of the amount of remaining liquid and allow repeated attachment and detachment with respect to the recording apparatus.

It is an object of the present invention to provide a technique that can limit liquid leakage during container replacement regardless of the amount of remaining liquid.

In order to achieve the above object, a liquid storage container attachable to and detachable from a recording apparatus that performs recording by ejecting liquid onto a recording material of the present invention includes:

- a liquid storage bag that includes a supply port for supplying liquid to a port to be supplied of the recording apparatus, is configured to store liquid, and is made of a flexible film;
- an opening and closing body movable between an open position that allows liquid to be supplied from the supply port to the port to be supplied and a closed position that closes the supply port;
- a handle configured to move the opening and closing body between the open position and the closed position; and
- a lock mechanism configured to lock the opening and closing body in the closed position so as to permit the opening and closing body to move to the open position only in a case where the liquid storage container is in an attached state in which the liquid storage container is attached to the recording apparatus.

In order to achieve the above object, a recording apparatus of the present invention includes:

- an apparatus main body including a recording portion configured to perform recording by ejecting liquid onto a recording material; and
- a liquid storage container that is attachable to and detachable from the apparatus main body,
- wherein the apparatus main body includes a port to be supplied for receiving supply of liquid from the liquid storage container, and
- wherein the liquid storage container includes:
  - a liquid storage bag that includes a supply port for supplying liquid to the port to be supplied, is configured to store liquid, and is made of a flexible film;
  - an opening and closing body movable between an open position that allows liquid to be supplied from the supply port to the port to be supplied and a closed position that closes the supply port;
  - a handle configured to move the opening and closing body between the open position and the closed position; and
  - a lock mechanism configured to lock the opening and closing body in the closed position so as to permit the opening and closing body to move to the open position only in a case where the liquid storage container is in an attached state in which the liquid storage container is attached to the recording apparatus.

According to the present invention, it is possible to limit liquid leakage during container replacement regardless of the amount of remaining liquid.

Further features of the present invention will become apparent from the following description of exemplary embodiments with reference to the attached drawings.

DESCRIPTION OF THE EMBODIMENTS

Figure 1:
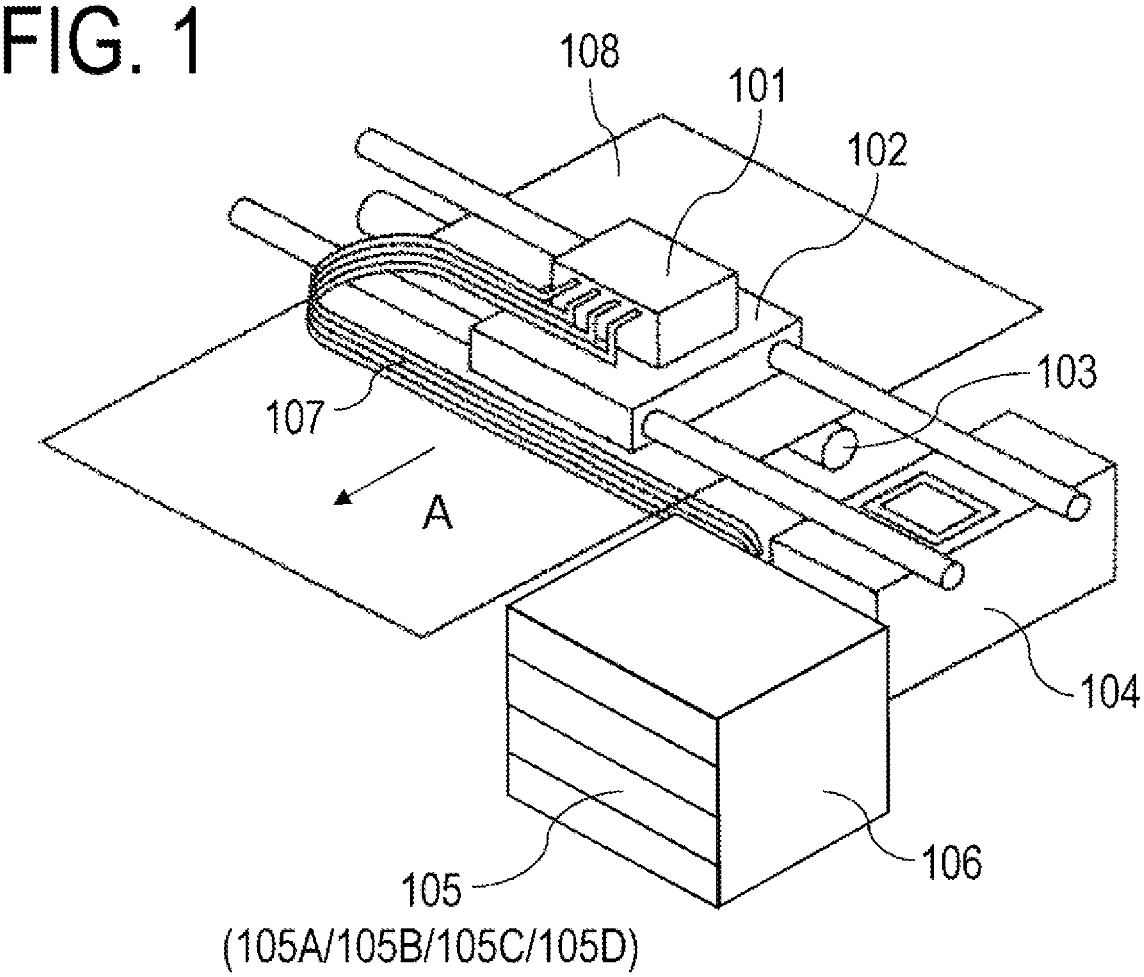
FIG. 1 is a perspective view showing the internal configuration of the main parts of a recording apparatus according to a first embodiment.

Referring to the drawings, exemplary modes for carrying out the present invention will be described in detail based on embodiments. The dimensions, materials, shapes, and relative arrangements of the components described in the embodiments may be modified as appropriate according to the configuration of the apparatus to which the invention is applied and various conditions. Also, not all combinations of features described in the present embodiments are essential for the solution means of the present invention. Components described in the embodiments are merely examples, and are not intended to limit the scope of the present invention only to the components.

First Embodiment

FIG. 1 is a perspective view schematically showing the configuration of a recording apparatus according to a first embodiment of the present invention. The recording apparatus shown in FIG. 1 repeats reciprocating movement (main scanning) of a recording head 101 and conveyance (subscanning) of a recording sheet 108, which is a recording medium (recording material), at a predetermined pitch. In synchronization with these movements, the recording apparatus selectively ejects ink, which is recording liquid of different colors, from the recording head 101 to cause the ink to land on the recording sheet 108 as the recording medium. The recording apparatus thus performs recording operation to form characters, symbols, images, and the like. The recording medium may be any medium that allows ink droplets to land thereon to form images. The recording medium may be of various materials and forms, such as paper, fabric, optical disc label surface, plastic sheet, OHP sheet, and envelope.

In FIG. 1, the recording head 101, which is a recording portion, is supported through a carriage 102 to be slidable along two guide rails, which extend parallel to each other and in the width direction of the recording sheet 108 perpendicular to the conveyance direction A of the recording sheet 108. That is, the recording head 101 reciprocates in the directions of the above-mentioned main scanning when a driving means such as a motor (not shown) reciprocates the carriage 102 in a straight line along the guide rails. The recording head 101 is detachably mounted on the carriage 102. The recording head 101 includes a plurality of nozzles (ejection ports) in ink ejection portions serving as liquid ejection portions for ejecting ink, which is recording liquid, toward the recording surface of the recording sheet 108. A conveyance roller 103 as a conveyance member conveys the recording sheet 108 in a conveyance direction intersecting the moving directions of the carriage 102 in a region facing the ink ejection surface including the nozzles of the ink ejection portions of the recording head 101. The recording head 101 includes, as a plurality of ink ejection portions, a plurality of nozzle rows for ejecting ink of mutually different colors.

Corresponding to the colors of ink to be ejected from the recording head 101, a plurality of independent ink storage portions 105 as liquid storage portions is detachably attached to an ink supply unit 106 as a liquid supply unit. Each ink storage portion 105 has an ink supply port 109 (see FIGS. 2A to 2C). The ink supply unit 106 and the recording head 101 are connected by a plurality of ink supply tubes 107 corresponding to the respective ink colors. Attaching the ink storage portions 105 to the ink supply unit 106 allows the ink of different colors stored in the ink storage portions 105 to be independently supplied to the respective nozzle rows in the recording head 101.

In a non-recording region, which is within the range of reciprocating movement of the recording head 101 and outside the range in which the recording sheet 108 passes, a recovery unit 104 is arranged to face the ink ejection surface of the recording head 101. The recovery unit 104 includes a cap portion for capping the ink ejection surface of the recording head 101, a suction mechanism for performing forcible suction of ink with the nozzles on the ink ejection surface capped, and a cleaning blade for removing smears on the ink ejection surface, for example. The above-mentioned suction is performed by the recovery unit 104 before the recording operation of the recording apparatus. As such, even when the recording apparatus is operated after being left unused for a long period of time, the recovery process performed by the recovery unit 104 removes residual bubbles in the ejection portions of the recording head 101 and thickened liquid near the ejection ports. This restores or maintains the ejection performance of the recording head 101.

Figure 2C:
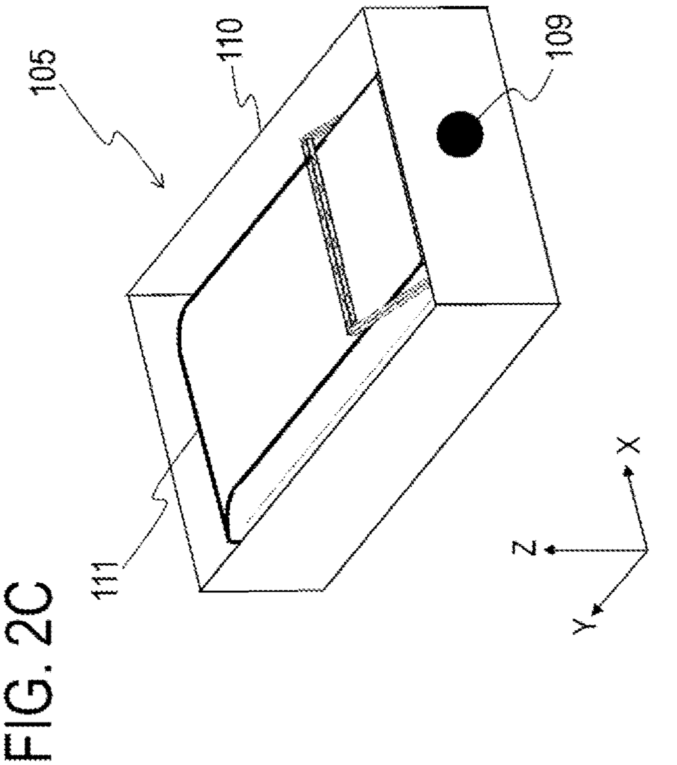
FIGS. 2A to 2C are perspective views showing the configuration of an ink storage portion 105 in FIG. 1.
Figure 2A:
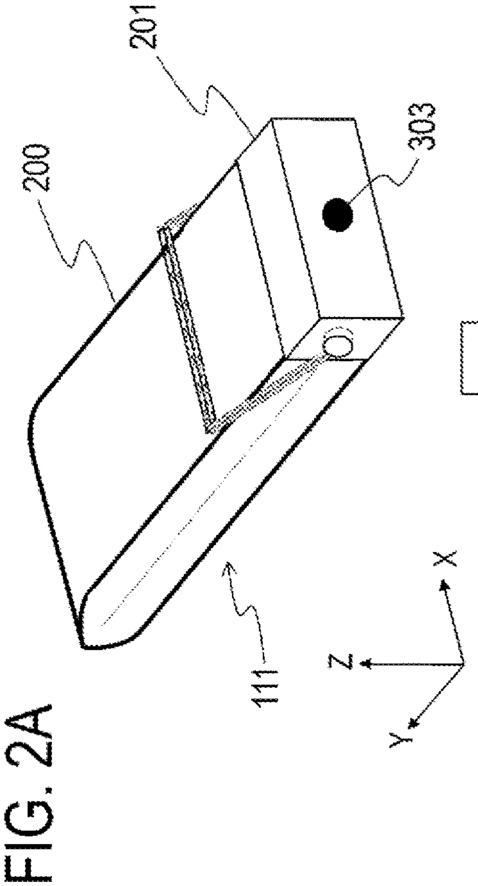
Figure 2B:
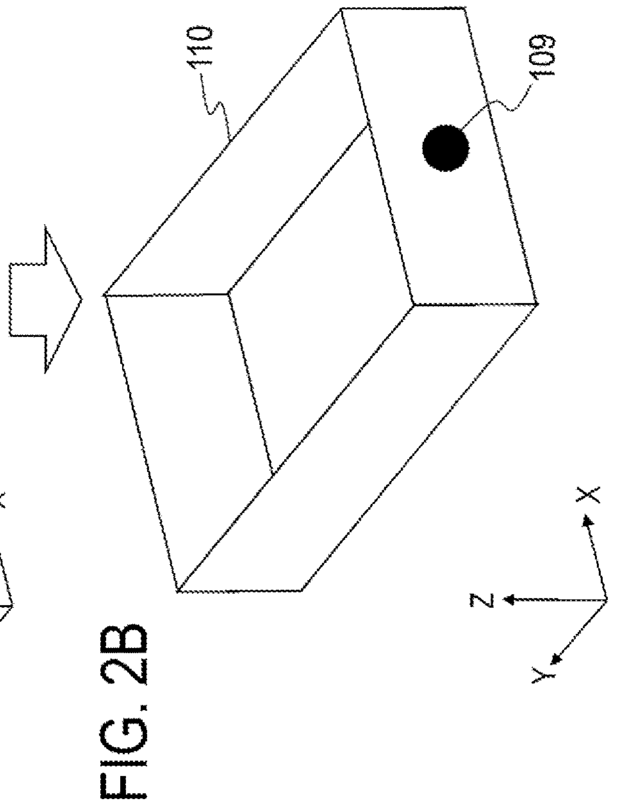
Figure 3A:
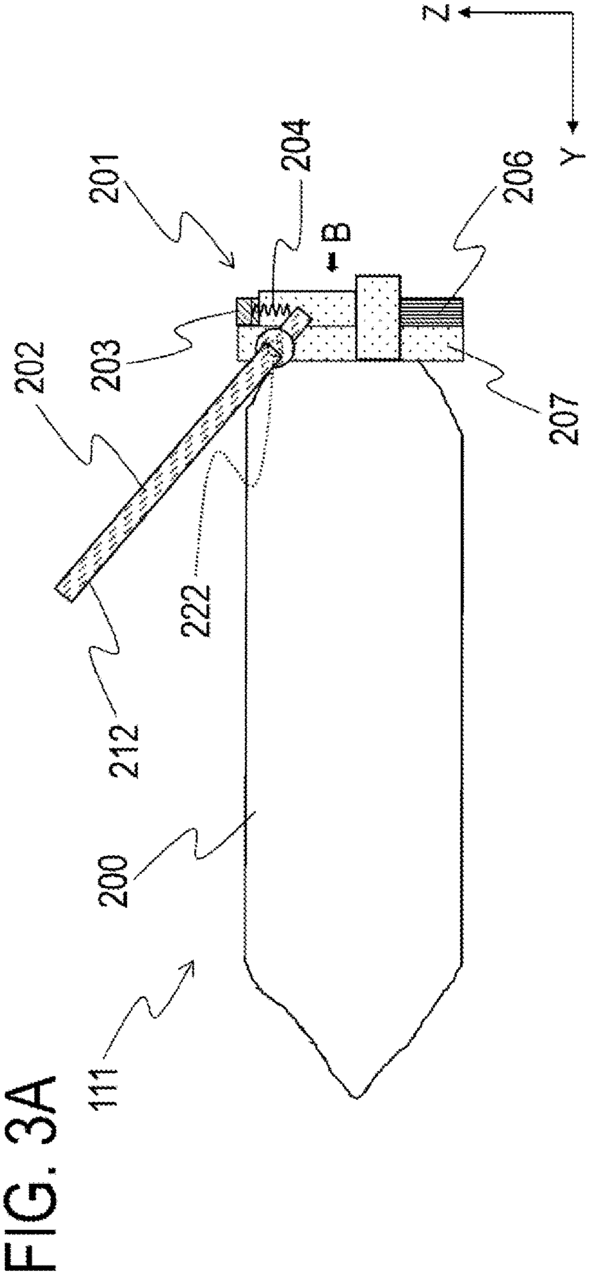
FIGS. 3A and 3B are side views showing the configuration of the main parts of an ink storage container of the first embodiment.
Figure 3B:
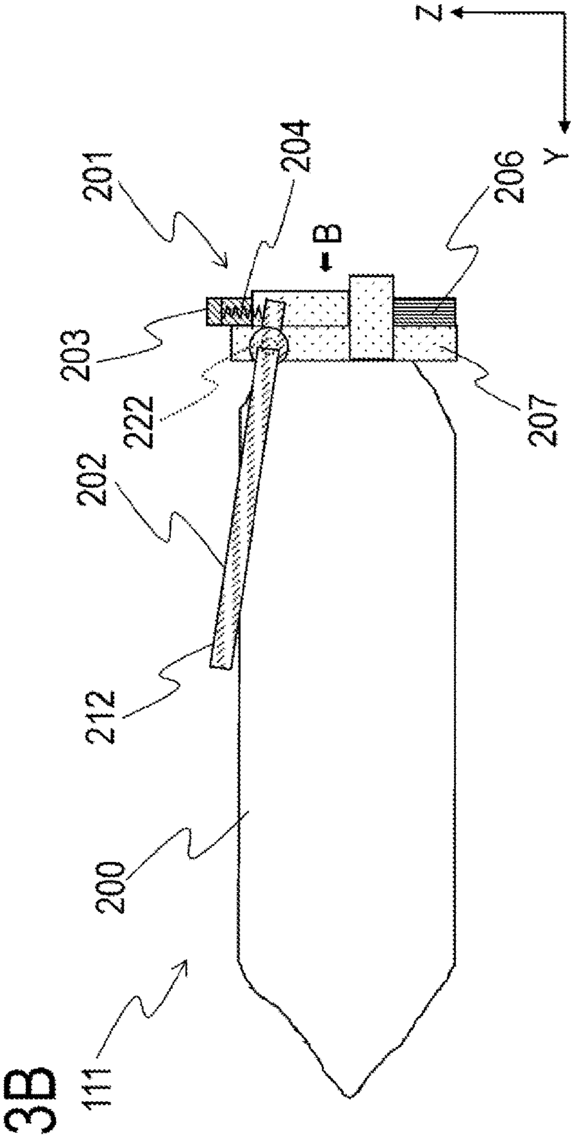

FIGS. 2A to 2C are schematic perspective views illustrating the internal configuration of an ink storage portion 105 to be placed in the ink supply unit 106 of the recording apparatus of FIG. 1. FIG. 2A is a schematic perspective view of an ink storage container 111, and FIG. 2B is a schematic perspective view of a tray 110, which stores the ink storage container 111. FIG. 2C is a schematic perspective view showing a state in which the ink storage container 111 of FIG. 2A is stored in the tray 110 of FIG. 2B. It should be noted that FIG. 2A schematically shows an ink supply portion 201 of the ink storage container 111, and illustration of its detailed structure is omitted. FIGS. 3A and 3B and subsequent figures show the detailed structure of the ink supply portion 201.

The ink storage portion 105 includes the tray 110 having an ink supply port 109 and the ink storage container 111 as a liquid storage container that stores ink. The ink storage container 111 generally includes an ink storage bag 200 as a liquid storage bag and an ink supply portion 201 as a liquid supply portion. The ink storage bag 200 is a bag-shaped liquid storage portion made of a flexible film such as an aluminum laminate, for example. The ink supply portion 201 has ink supply ports (ink flow holes 303, 304), which can supply ink to the recording apparatus main body when communicating with the ink supply port 109 of the tray 110. To place the ink storage portion 105 in the ink supply unit 106 of the recording apparatus, the ink storage container 111 is first inserted from above into the storage portion of the tray 110 opening upward (in the Z direction). Then, the ink storage container 111 is placed on the bottom surface of the storage portion of the tray 110 so that the ink supply port 109 of the tray and the ink supply port of the ink storage container 111 are at approximately the same height. By placing the ink storage portion 105, in which the ink storage container 111 is housed and placed in the tray 110, into the ink supply unit 106, the ink in the ink storage container 111 can be supplied to the recording head 101 through the ink supply tube 107 provided in the recording apparatus.

Figure 4:
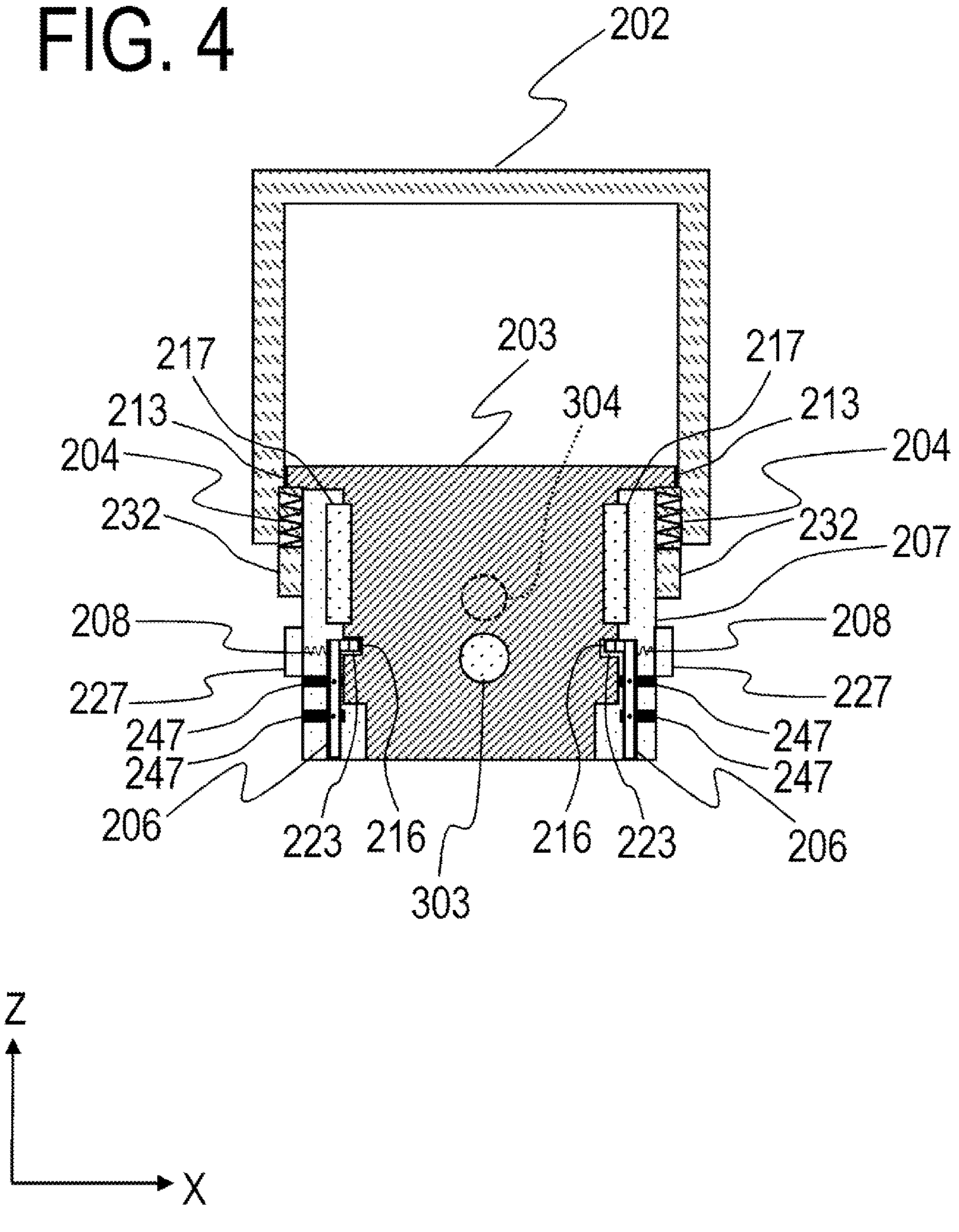
FIG. 4 is a fragmentary view as seen in the direction of arrow B in FIGS. 3A and 3B.

FIGS. 3A and 3B are side views showing the configuration of the main parts of the ink storage container 111 according to the first embodiment. FIG. 3A shows a closed state in which the ink supply port of the ink supply portion 201 is closed, and FIG. 3B shows an open state in which the ink supply port of the ink supply portion 201 is open. FIG. 4 is a fragmentary view as seen in the direction of arrow B in FIGS. 3A and 3B and is a front view of the ink supply portion 201.

The recording apparatus of the present embodiment includes independent ink storage containers 111 for the respective ink colors, and all ink storage containers 111 have the same configuration. That is, as described above, each ink storage container 111 of the present embodiment generally includes an ink storage bag 200 as a bag-shaped liquid storage portion made of a flexible film and an ink supply portion 201 as a liquid supply portion. The ink supply portion 201 generally includes a handle 202, an opening and closing body 203, springs 204 as urging members, opening and closing body restraining locks (hereinafter simply referred to as locks) 206 as locking members, a connection member 207, and springs 208 as elastic members. The members of the handle 202, the opening and closing body 203, the springs 204, the locks 206, and the springs 208 are integrally coupled to the connection member 207, and the connection member 207 is integrally attached to the ink storage bag 200. That is, the members of the handle 202, the opening and closing body 203, the springs 204, the locks 206, and the springs 208 are integrally coupled to the ink storage bag 200 through the connection member 207.

Figure 5A:
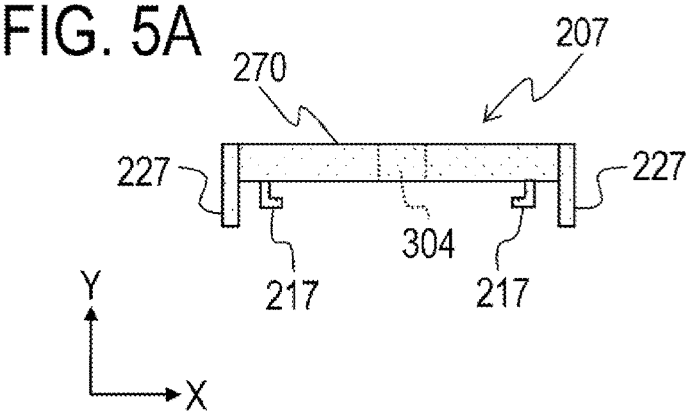
FIGS. 5A to 5C are explanatory diagrams of the configuration of a connection member.
Figure 5B:
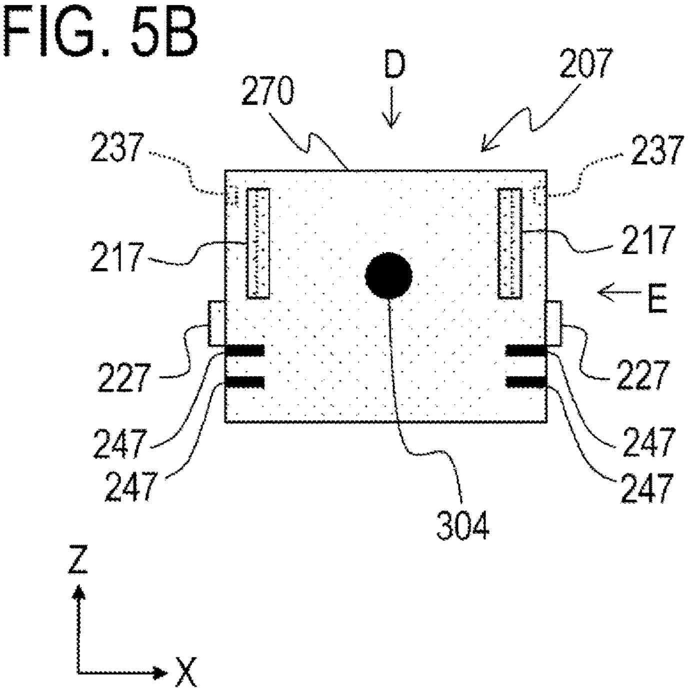
Figure 5C:
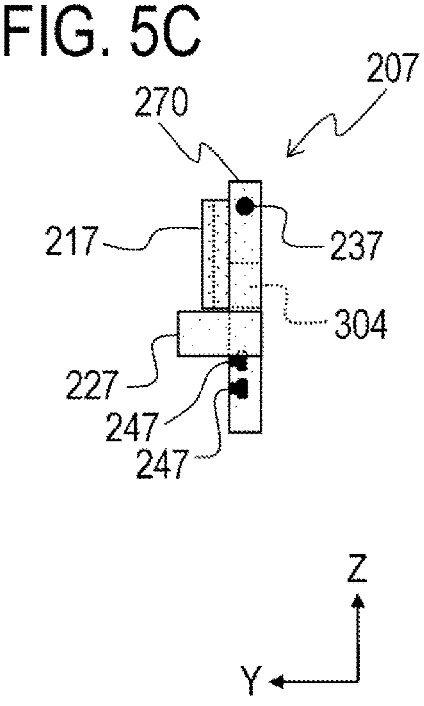

FIGS. 5A to 5C are explanatory diagrams of the configuration of the connection member 207. FIG. 5A is a fragmentary view (top view) as seen from the direction of arrow D in FIG. 5B, FIG. 5B is a front view of the connection member 207, and FIG. 5C is a fragmentary view (side view) as seen from the direction of arrow E in FIG. 5B.

The connection member 207 is a substantially plate-shaped member and has an ink flow hole 304, which is a through hole. The connection member 207 is attached to the ink storage bag 200 such that the ink inside the ink storage bag 200 does not leak from sections other than the ink flow hole 304. That is, in addition to connecting the ink storage bag 200 to the members of the handle 202, the opening and closing body 203, the springs 204, the locks 206, and the springs 208, the connection member 207 forms an ink supply port of the ink storage bag 200.

The connection member 207 includes a substantially plate-shaped main body 270, through which the ink flow hole 304 extends. The connection member 207 also includes gripping guide portions 217 for supporting the opening and closing body 203 such that the opening and closing body 203 can slide in predetermined directions relative to the main body 270. The gripping guide portions 217 are provided in a pair, sandwich the opening and closing body 203 in the X direction, and project in the −Y direction from the surface of the main body 270 on which the opening and closing body 203 is located. The gripping guide portions 217 are hook-shaped and have distal ends bent in the directions in which the gripping guide portions 217 face each other (±X directions). This hook-shaped configuration allows the gripping guide portions 217 to sandwich the opening and closing body 203 with the main body 270 in the Y direction. That is, the gripping guide portions 217 hold the opening and closing body 203 so as to restrict movement of the opening and closing body 203 in the X directions and the Y directions and permit movement of the opening and closing body 203 in the Z directions relative to the main body 270.

The connection member 207 includes spring bearing portions 227 each supporting one end of a spring 208, which is coupled between a lock 206 and the spring bearing portion 227. The spring bearing portions 227 are provided in a pair on both sides of the main body 270 in the X direction and project in the −Y direction toward the side of the main body 270 on which the opening and closing body 203 is coupled. The spring bearing portions 227 are positioned so that the locks 206 and the springs 208 are interposed between the opening and closing body 203 and the spring bearing portions 227 in the X direction.

The connection member 207 has a pair of bearing holes 237, which rotationally support the handle 202. These bearing holes 237 are provided in the side edge surfaces of the main body 270 in the X directions and recessed in the X directions.

The connection member 207 includes guide grooves 247, which hold the locks 206 relative to the main body 270 and guide movement of the locks 206 between a non-engagement position and an engagement position. The guide grooves 247 are grooves that are recessed in the surface of the main body 270 on which the opening and closing body 203 and the lock 206 are coupled, and extend in the X direction, which is the direction of movement of the locks 206. Each lock 206 includes screws 226 as guided projections to be guided by the guide grooves 247. Each guide groove 247 has a groove shape in which the width of the opening side is smaller than the width of the groove bottom side, corresponding to the shape of the screw 226 (the shape including a screw portion and a head portion having a greater diameter than the screw portion). The edge portion with a smaller width on the opening side functions to stop removal of the screw 226. The guide groove 247 opens in the X direction at the side edge surface in the X direction of the main body 270 to form an insertion hole for coupling the lock 206 to the connection member 207.

A plurality of guide grooves 247 are provided for each of the pair of locks 206. Typically, two guide grooves 247 are provided for one lock 206, and the two guide grooves 247 function as rotation stoppers for restricting rotation of the lock 206 relative to the main body 270.

Figure 6A:
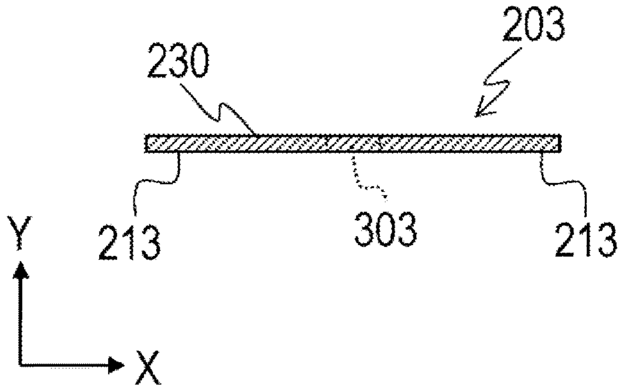
FIGS. 6A to 6C are explanatory diagrams of the configuration of an opening and closing body.
Figure 6B:
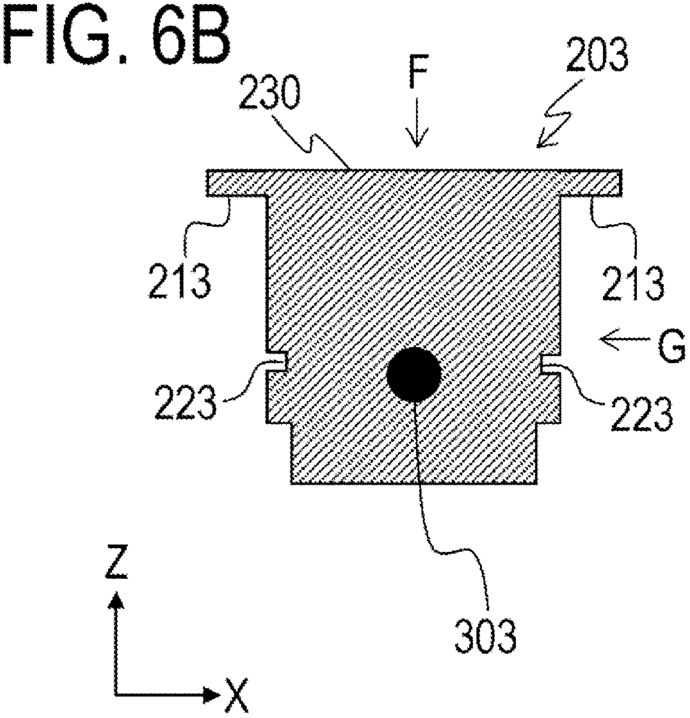
Figure 6C:
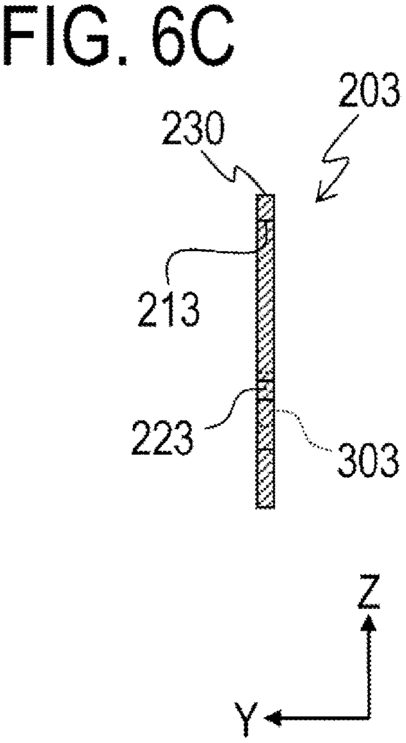

FIGS. 6A to 6C are explanatory diagrams of the configuration of the opening and closing body 203. FIG. 6A is a fragmentary view as seen in the direction of arrow F in FIG. 6B, FIG. 6B is a front view of the opening and closing body 203, and FIG. 6C is a fragmentary view as seen in the direction of arrow G in FIG. 6B.

The opening and closing body 203 is a substantially plate-shaped member and has an ink flow hole 303, which is a through hole. The opening and closing body 203 is coupled to the connection member 207 so as to be slidable in a predetermined manner, and is a member for opening and closing the ink flow hole 304 of the connection member 207, that is, a member for opening and closing the ink supply port of the ink storage container 111.

The opening and closing body 203 includes a substantially plate-shaped main body 230 through which the ink flow hole 303 extends. Both side edge portions in the X directions of the main body 230 of the opening and closing body 203 are held by the main body 270 and the gripping guide portions 217 of the connection member 207 described above such that movements in the X direction and Y direction are restricted. The opening and closing body 203 is slidable in the Z directions relative to the connection member 207 while being guided by the gripping guide portions 217. This slide movement allows the opening and closing body 203 to move between an open position in which the ink flow hole 303 of the opening and closing body 203 and the ink flow hole 304 of the connection member 207 overlap each other in the Y direction and communicate with each other, and a closed position in which they do not overlap each other in the Y direction and do not communicate.

That is, in this embodiment, the ink flow hole 303 of the opening and closing body 203 and the ink flow hole 304 of the connection member 207 form the ink supply port (ink flow passage) of the ink storage container 111. The ink flow hole 303 of the opening and closing body 203 is a communication hole that provides communication between the ink flow hole 304 of the connection member 207, which is the supply port of the ink storage bag 200, and the ink supply port 109 of the tray 110, which is the port to be supplied of the apparatus main body. Positioning the opening and closing body 203 in the open position enables the ink in the ink storage bag 200 to be supplied from the ink flow hole 304 to the ink supply port 109 through the ink flow hole 303.

The opening and closing body 203 has spring bearing portions 213 for receiving an operating force of the handle 202 through the springs 208 in the Z direction, which is the direction in which the opening and closing body 203 slides relative to the connection member 207. The spring bearing portions 213 are provided in a pair and project in the X directions from both ends of the main body 230 in the X direction.

The opening and closing body 203 has recessed portions 223 in the side surfaces in the X direction of the main body 230. The recessed portions 223 serve as engaged portions for forming a state in which the opening and closing body 203 is locked in the closed position by the locks 206. The recessed portions 223 are formed in the main body 230 so as to be recessed in the X directions, which are perpendicular to an application direction in which the springs 208, which connect the handle 202 to the opening and closing body 203, apply urging force to the opening and closing body 203. The recessed portions 223 are provided on both side surfaces in the X direction of the main body 230 corresponding to the pair of locks 206.

Figure 7A:
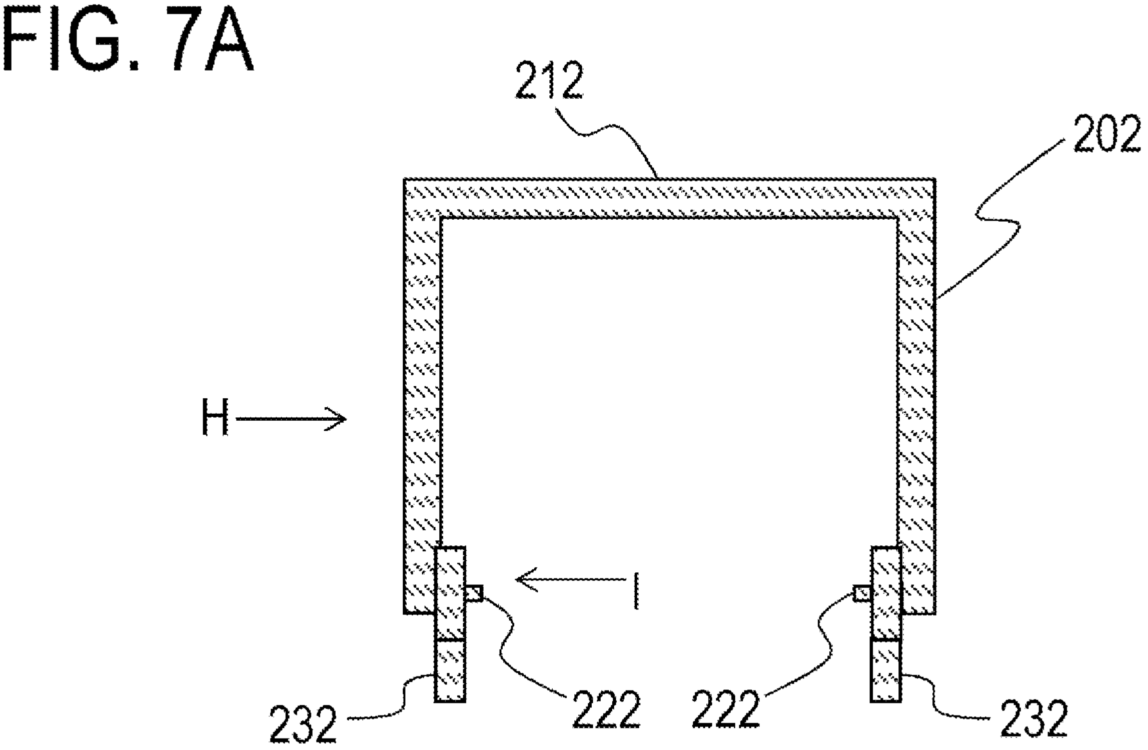
FIGS. 7A to 7C are explanatory diagrams of the configuration of a handle.
Figure 7B:
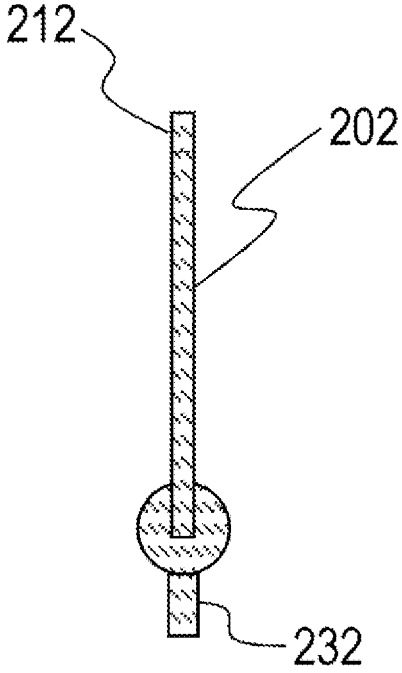
Figure 7C:
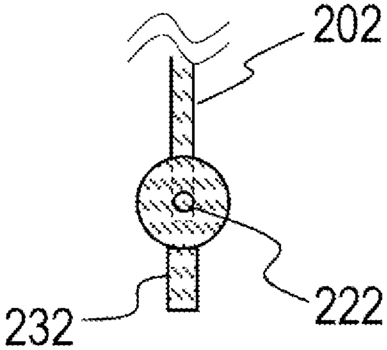

FIGS. 7A to 7C are explanatory diagrams of the configuration of the handle 202. FIG. 7A is a front view of the handle 202, FIG. 7B is a fragmentary view as seen in the direction of arrow H in FIG. 7A, and FIG. 7C is a fragmentary view as seen in the direction of arrow I in FIG. 7A.

The handle 202 has a substantially U-shaped grip portion 212, which is the section mainly gripped by the user to open or close the opening and closing body 203, and shaft portions 222, which serve as the rotation center of the handle 202. The grip portion 212 includes a pair of arms extending parallel to each other in a direction perpendicular to the X direction, and a connecting portion extending in the X direction at one end of each arm to connect the arms to each other. The shaft portions 222 are provided in a pair at the other ends of the arms of the grip portion 212. The shaft portions 222 are concentric and extend inward in the X directions. The grip portion 212 may also be gripped when the user attaches or detaches the ink storage container 111 to or from the tray 110. Each of the pair of shaft portions 222 is configured to be inserted in the corresponding one of the pair of bearing holes 237 of the connection member 207 described above, and rotatable about the axis of the shaft portion 222 relative to the bearing hole 237. That is, the handle 202 is supported at the bearing holes 237 of the connection member 207 so as to be rotatable relative to the connection member 207 about the shaft portions 222 with the axes of the shaft portions 222 serving as the axis of rotation.

The handle 202 also includes spring bearing portions 232 on the opposite side of the shaft portions 222 from the grip portion 212. The spring bearing portions 232 are provided in a pair corresponding to the pair of shaft portions 222. The spring bearing portions 232 are application portions that apply the operating force of the handle 202 caused by the user to the opening and closing body 203 through the springs 204. The spring bearing portions 232 are coupled to the spring bearing portions 213 of the opening and closing body 203 through the springs 204. As the handle 202 rotates, the relative distance between the spring bearing portions 213 of the opening and closing body 203 and the spring bearing portions 232 of the handle 202 changes, causing the springs 204 to deform to extend or contract. The urging force corresponding to the operating amount of the handle 202 is thus applied to the opening and closing body 203.

In this embodiment, the springs 204 are used as elastic members that are deformable to extend or contract and couple the handle 202 to the opening and closing body 203. However, as long as the same function is achieved, other members or mechanisms, such as flat springs, may also be used.

As shown in FIGS. 3A and 3B, the grip portion 212 of the handle 202 is configured to extend in such a direction that the grip portion 212 is farther from the connection member 207 at locations farther from the shaft portions 222 and in a direction toward the side of the connection member 207 on which the ink storage bag 200 is located. As the grip portion 212 rotates about the shaft portions 222, its angular posture relative to the ink storage bag 200 changes, and its projecting height from the ink storage bag 200 changes.

That is, as shown in FIG. 3A, when the handle 202 is in a closing posture (closing action position) that positions the opening and closing body 203 in the closed position that closes the ink supply port of the ink supply portion 201, the grip portion 212 assumes an angular posture in which the grip portion 212 is farthest from the ink storage bag 200. The height of the grip portion 212 from the ink storage bag 200 is highest in this posture. In contrast, as shown in FIG. 3B, when the handle 202 is in an opening posture (opening action position) that positions the opening and closing body 203 in the open position that opens the ink supply port of the ink supply portion 201, the grip portion 212 assumes an angular posture in which the grip portion 212 is closest to the ink storage bag 200. The height of the grip portion 212 from the ink storage bag 200 is lowest in this posture. This posture forms a storage state of the ink storage container 111 when the ink storage portion 105, in which the ink storage container 111 is attached to the tray 100, is placed into the ink supply unit 106.

Figure 8A:
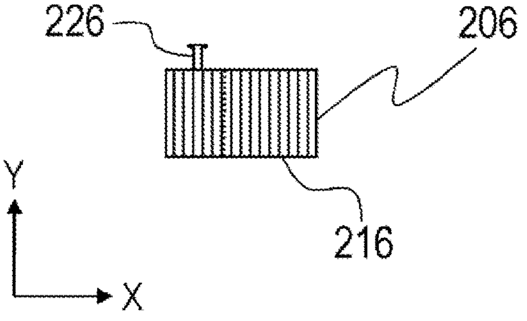
FIGS. 8A to 8C are explanatory diagrams of the configuration of an engagement member.
Figure 8B:
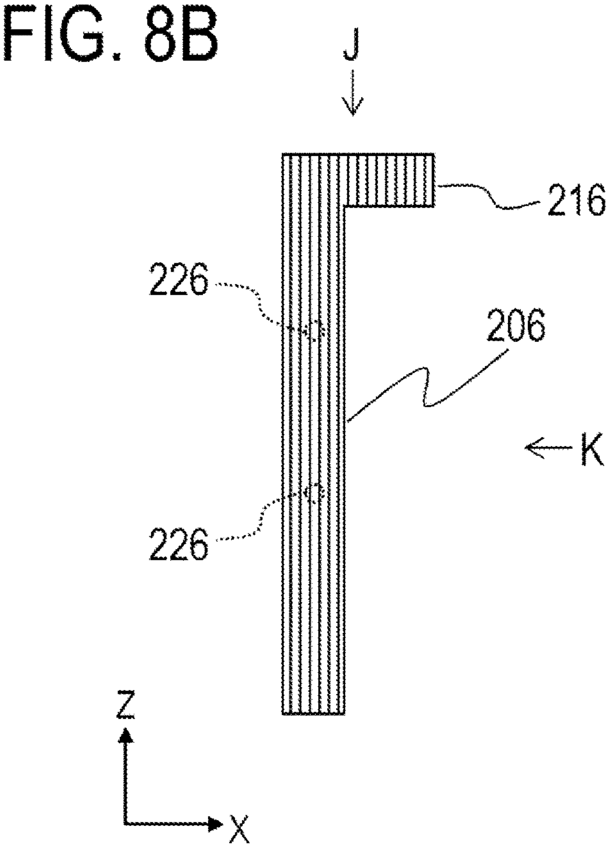
Figure 8C:
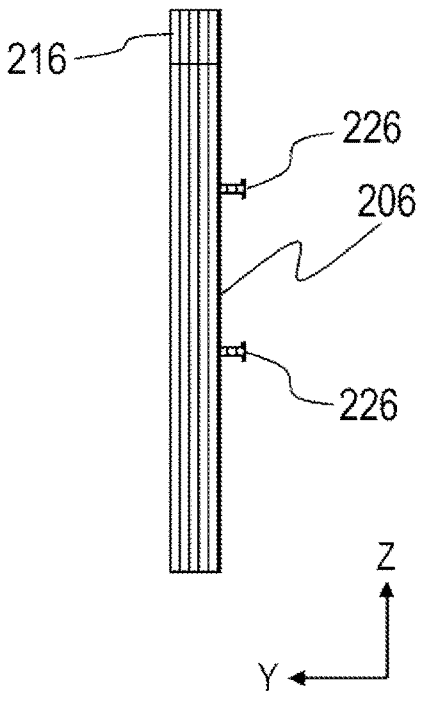

FIGS. 8A to 8C are explanatory diagrams of the configuration of a lock 206 as an engagement member. FIG. 8A is a fragmentary view as seen in the direction of arrow J in FIG. 8B, FIG. 8B is a front view of the lock 206, and FIG. 8C is a fragmentary view as seen in the direction of arrow K in FIG. 8B.

The lock 206 is a substantially L-shaped member having a part extending in the Z direction and a part extending in the X direction. The lock 206 includes a protruding portion 216, which is an engagement portion extending in the X direction to lock the opening and closing body 203 in the closed position. As for the lock 206, the X direction is a direction perpendicular to the Z directions, which are the sliding directions of the opening and closing body 203, and is a direction perpendicular to the application direction in which the handle 202 applies an operating force to the opening and closing body 203 through the springs 208. The protruding portion 216 can be fitted in a recessed portion 223 of the opening and closing body 203 in the X direction. When the protruding portion 216 is fitted in the recessed portion 223, the protruding portion 216 engages with the recessed portion 223 in the Z directions, that is, in the sliding directions of the opening and closing body 203 relative to the connection member 207. As such, the protruding portion 216 is configured to restrict slide movement of the opening and closing body 203 relative to the connection member 207. That is, when the protruding portion 216 of the lock 206 is fitted in the recessed portion 223, the opening and closing body 203 is locked in the closed position relative to the connection member 207.

As described above, each lock 206 has a plurality of screws 226 (two screws in this embodiment) as guided projections to be guided by guide grooves 247 of the connection member 207. This embodiment is an example of a configuration including screws 226 as guided projections, but other configurations of the same function may also be used.

A spring 208 is attached between the connection member 207 and the side of the lock 206 opposite to the protruding portion 216 in the X direction. The spring 208 has one end attached to the spring bearing portion 227 of the connection member 207 and the other end attached to the lock 206. The spring 208 is coupled so as to contract in the X direction between the spring bearing portion 227 and the lock 206. The spring 208 urges the lock 206 in the X direction toward the opening and closing body 203. That is, the lock 206 is configured to be automatically movable by the urging force of the spring 208 from a non-engagement position, in which the protruding portion 216 is not fitted in the recessed portion 223 of the opening and closing body 203, to an engagement position, in which the protruding portion 216 is fitted in the recessed portion 223, when the opening and closing body 203 moves to the closed position.

In this embodiment, the lock mechanisms formed by the locks 206 and the recessed portions 223 of the opening and closing body 203 are provided in a pair on both sides in the X direction, which is the width direction perpendicular to the sliding directions of the opening and closing body 203. Although it is preferable to provide a pair in the width direction for a stable sliding operation, the lock mechanism may be provided only on one side.

The present embodiment uses the springs 208 as the urging members that urge the locks 206 to place the locks 206 in the engagement position in which the opening and closing body 203 is locked in the closed position. However, as long as the same function is achieved, other members and mechanisms, such as flat springs, may be used.

When the ink storage container 111 configured as described above is in an unattached state in which the ink storage container 111 is removed from the tray 110, that is, a state in which the ink storage container 111 is handled by the user by itself, the above-mentioned lock mechanism restricts movement of the opening and closing body 203 to the open position and maintains it in the closed position. In this state, even when the handle 202 is operated, the engagement state between the locks 206 and the opening and closing body 203 is maintained. That is, even when the urging force of the springs 204 acting on the opening and closing body 203 changes due to a change in the posture of the handle 202, the engagement of the locks 206 restricts movement of the opening and closing body 203 between the closed position and the open position. Thus, the ink supply port of the ink supply portion 201 does not open.

When the ink storage container 111 is in the attached state in which the ink storage container 111 is attached to the recording apparatus, engagement of the locks 206 is released by engagement releasing portions, which will be described below, disposed in the tray 110, so that the opening and closing body 203 is permitted to move to the open position. That is, it becomes possible to open and close the ink supply port of the ink supply portion 201 by operating the handle 202.

Figure 9:
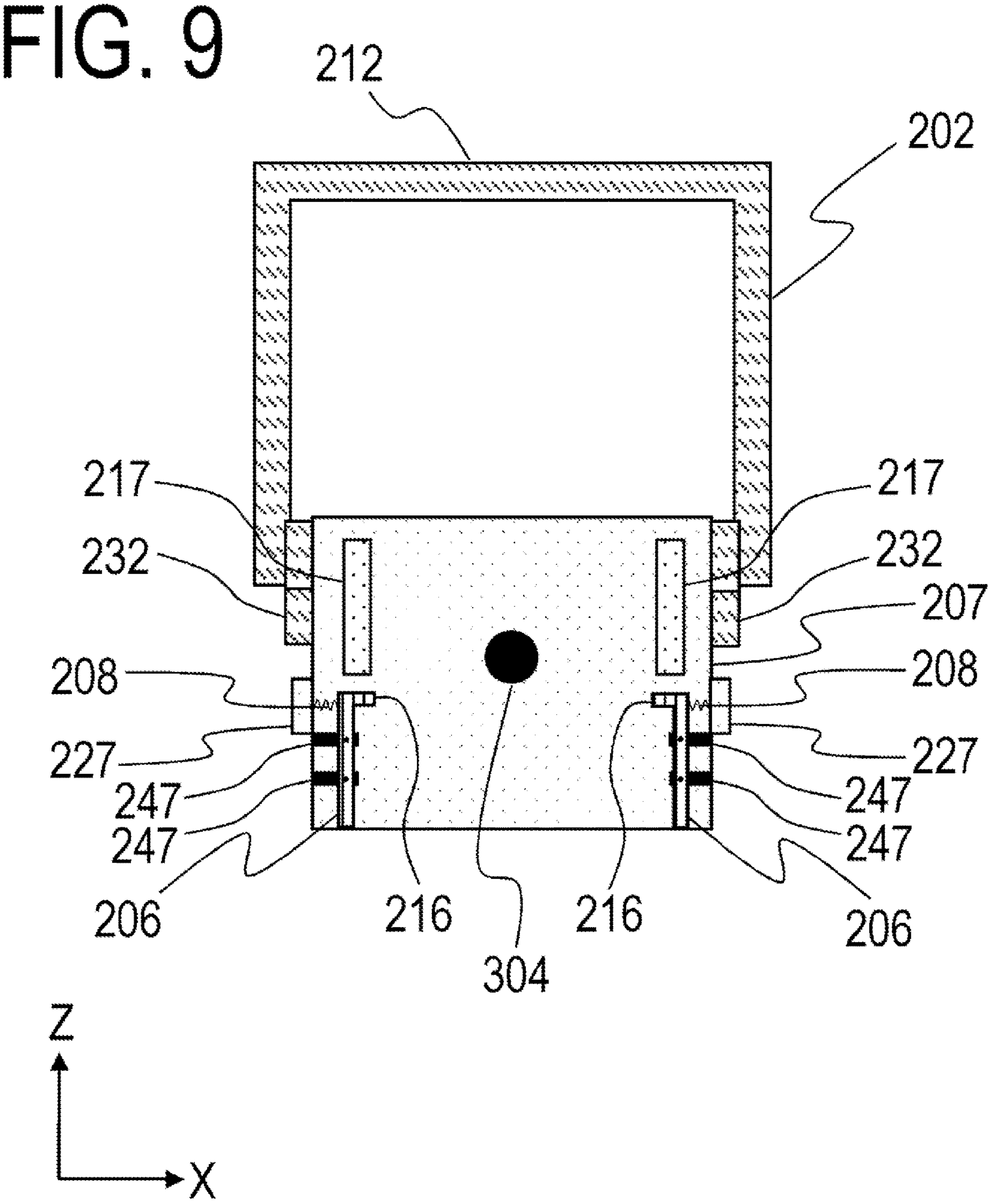
FIG. 9 is a fragmentary view as seen in the direction of arrow B in FIGS. 3A and 3B.
Figure 10:
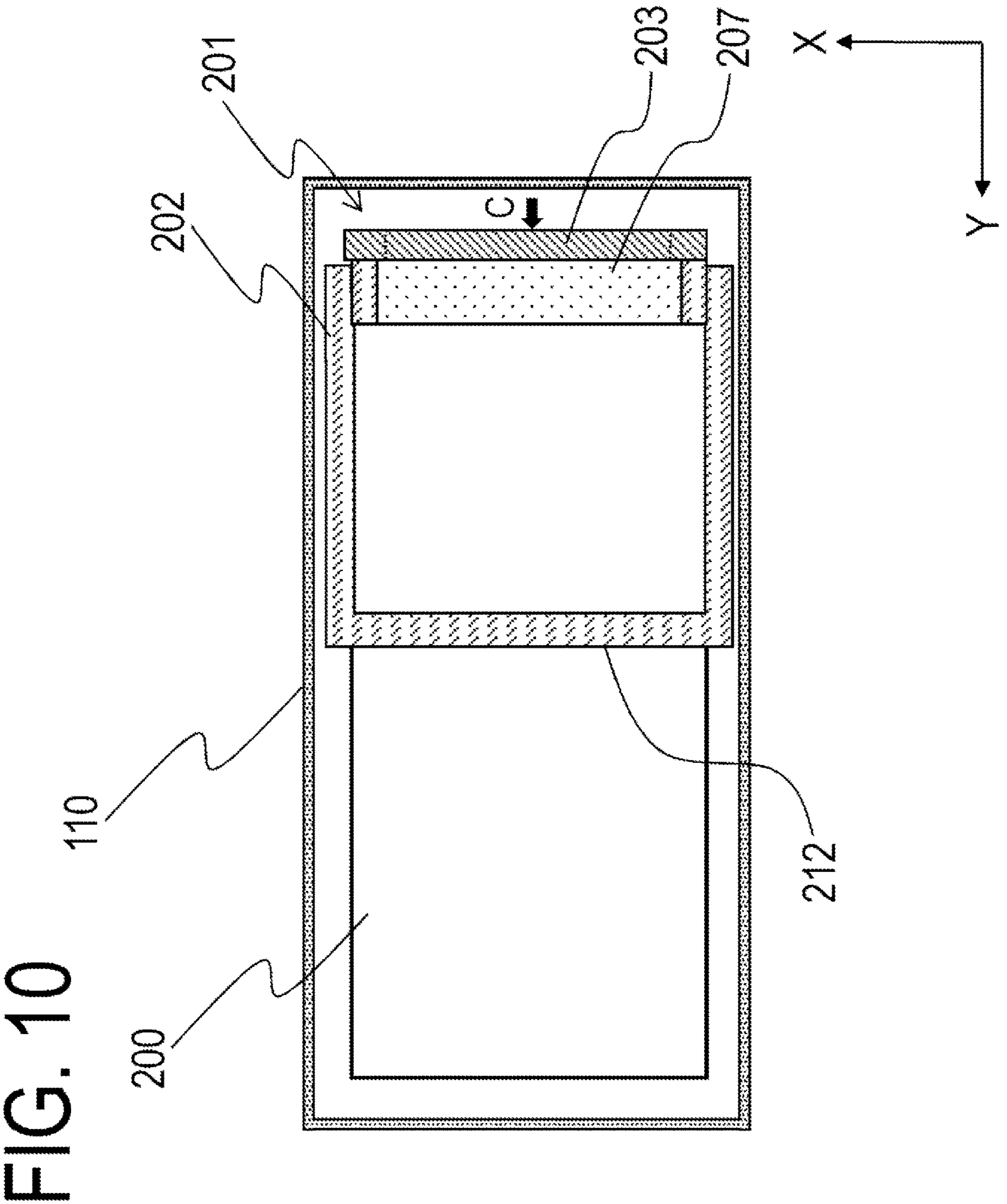
FIG. 10 is a top view of a state in which the ink storage container of the first embodiment is attached to a tray.
Figure 11:
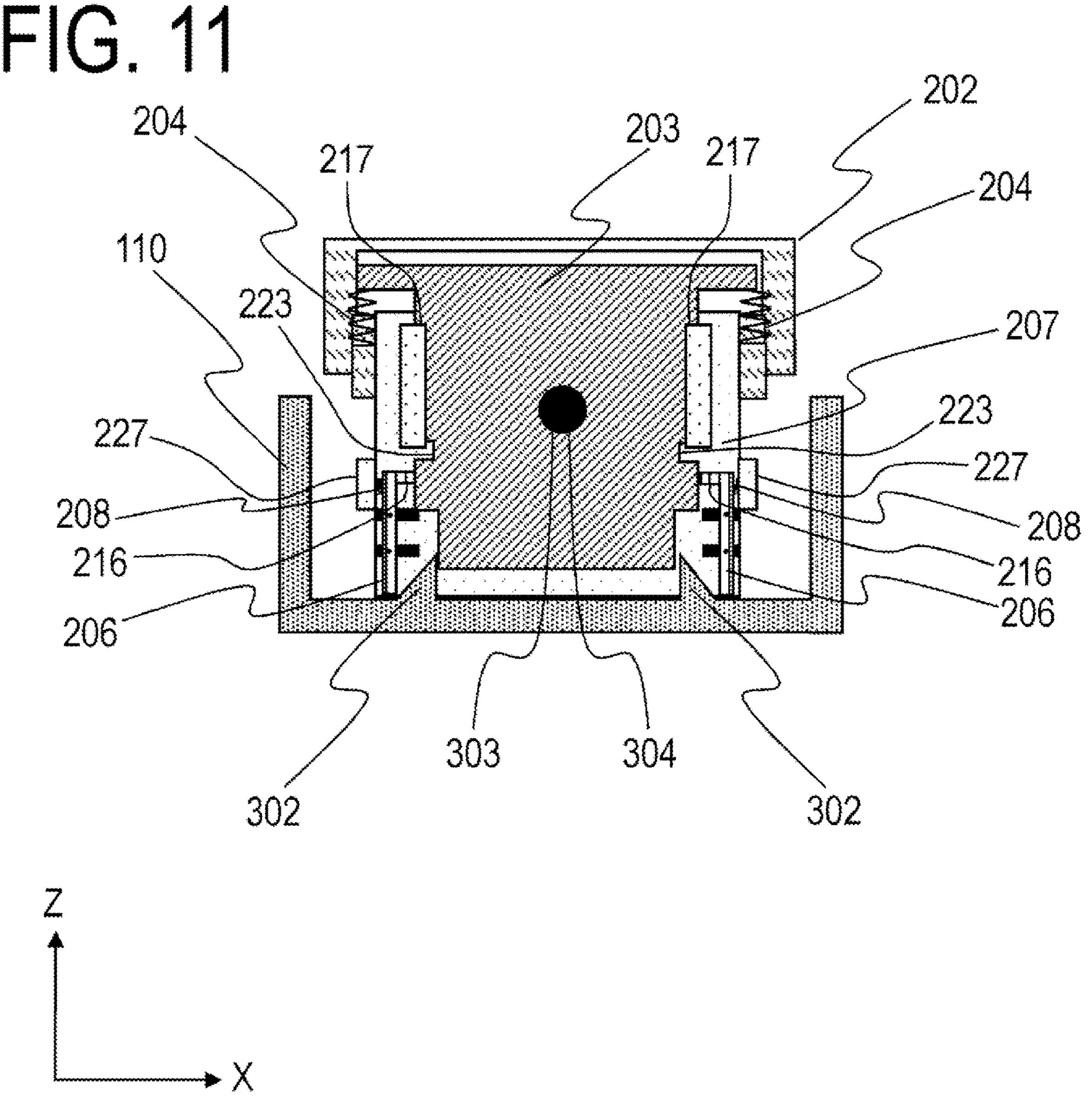
FIG. 11 is a fragmentary view as seen in the direction of arrow C in FIG. 10.

FIG. 9 is a fragmentary view of the ink storage container 111 of the present embodiment as seen in the direction of arrow B in FIG. 3A with the opening and closing body 203 removed (illustration is omitted). FIG. 10 is a schematic plan view showing a state in which the ink storage container 111 is housed in the tray 110 of the recording apparatus, and shows a housed state in which the handle 202 is in the opening posture (corresponding to FIG. 3B). FIG. 11 is a fragmentary view of the ink storage container 111 as seen from the direction of arrow C in FIG. 10 and from the ink supply port side.

As shown in FIG. 11, the bottom surface of the tray 110 of the recording apparatus includes engagement releasing portions 302, which assist the engagement releasing operation of the locks 206. The engagement releasing portions 302 are configured to, during the process of attaching the ink storage container 111 to the tray 110, come into contact with the locks 206 and release the locked state of the opening and closing body 203 caused by the locks 206. That is, each engagement releasing portion 302 is configured to apply, to the corresponding lock 206, a force that moves the lock 206 from the engagement position, in which the protruding portion 216 of the lock 206 is fitted in the recessed portion 223 of the opening and closing body 203, to the non-engagement position, in which the protruding portion 216 is disengaged from the recessed portion 223.

As a specific configuration of the engagement releasing portion 302, the present embodiment uses a cam plate structure including an inclined surface that is inclined with respect to the X direction and the Z direction as shown FIG. 11, for example. That is, the configuration comes into contact with the lock 206 such that a force component in the X direction that moves the lock 206 from the engagement position to the non-engagement position is applied to the lock 206. It should be noted that structures and configurations different from those of the present embodiment may be used as long as the same function is achieved.

The engagement releasing portions 302 are also configured to lock the locks 206 in the non-engagement position while the ink storage container 111 is attached to the tray 110. That is, while the ink storage container 111 is attached to the tray 110, a state is maintained in which opening and closing movement of the opening and closing body 203 by an operation of the handle 202 is permitted. In other words, the opening and closing body 203 is permitted to move to the open position only when the ink storage container 111 is in the attached state and attached to the tray 110. At this time, the springs 208 are held in a state in which the springs 208 are more deformed and contracted than when the locks 206 are located in the engagement position.

The handle 202 is configured to be maintained in the closing posture once brought into the closing posture, and to be maintained in the opening posture once brought into the opening posture moving the opening and closing body 203 into the open position, unless a specific external force is applied. That is, as for the distance between the spring bearing portions 232 of the handle 202 and the spring bearing portions 213 of the opening and closing body 203, a first distance in a state in which the handle 202 is in the closing posture and the opening and closing body 203 is in the closed position is substantially the same as a second distance in a state in which the handle 202 is in the opening posture and the opening and closing body 203 is in the open position. Each spring 204 is coupled so as to have its natural length, which does not produce urging force in the contraction direction or urging force in the extension direction, while the handle 202 is in the closing posture and the opening and closing body 203 is in the closed position, and while the handle 202 is in the opening posture and the opening and closing body 203 is in the open position. Thus, when the ink storage container 111 is attached to the tray 110, the handle 202 is pressed down to the opening posture, and the opening and closing body 203 moves to the open position, the springs 204 can urge to maintain the handle 202 in the closing posture and maintain the opening and closing body 203 in the open position.

When the handle 202 is pressed down from the closing posture to the opening posture (FIG. 3A to FIG. 3B), the distance between the spring bearing portions 232 of the handle 202 and the spring bearing portions 213 of the opening and closing body 203 decreases. As a result, the springs 204 deform to contract between the spring bearing portions 232 and the spring bearing portions 213, and the resilience from the contraction deformation acts to move the opening and closing body 203 from the closed position to the open position. When the opening and closing body 203 is lifted to the open position, the distance between the spring bearing portions 232 of the handle 202 and the spring bearing portions 213 of the opening and closing body 203 returns to the distance corresponding to the natural length of the springs 204.

When the handle 202 is lifted from the opening posture to the closing posture (FIG. 3B to FIG. 3A), the distance between the spring bearing portions 232 of the handle 202 and the spring bearing portions 213 of the opening and closing body 203 increases. As a result, the springs 204 deform to extend between the spring bearing portions 232 and the spring bearing portions 213, and the resilience from the extension deformation acts to move the opening and closing body 203 from the open position to the closed position. When the opening and closing body 203 is lowered to the closed position, the distance between the spring bearing portions 232 of the handle 202 and the spring bearing portions 213 of the opening and closing body 203 returns to the distance corresponding to the natural length of the springs 204.

Figure 12:
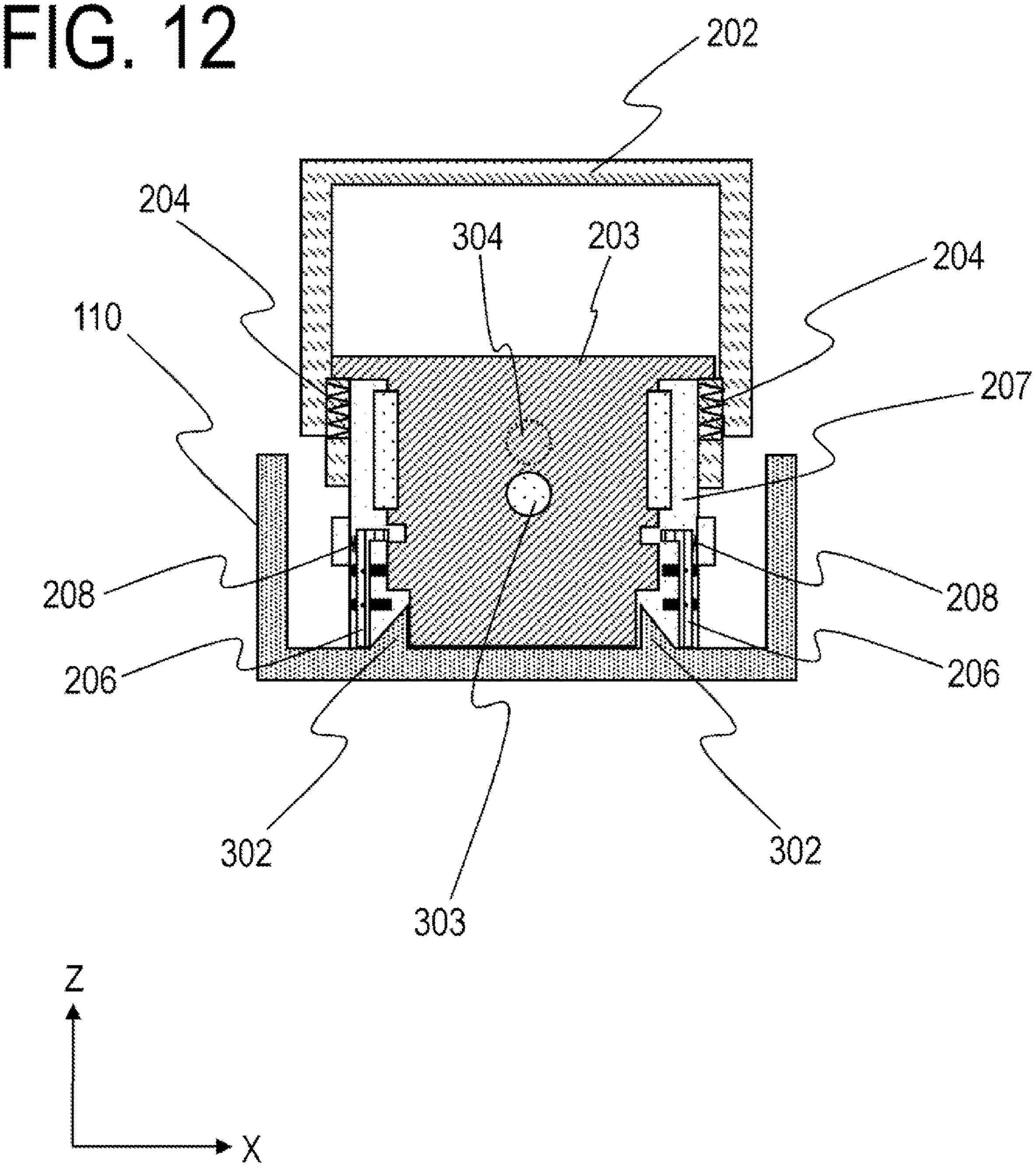
FIG. 12 is a diagram of a state in which the handle is lifted.
Figure 13:
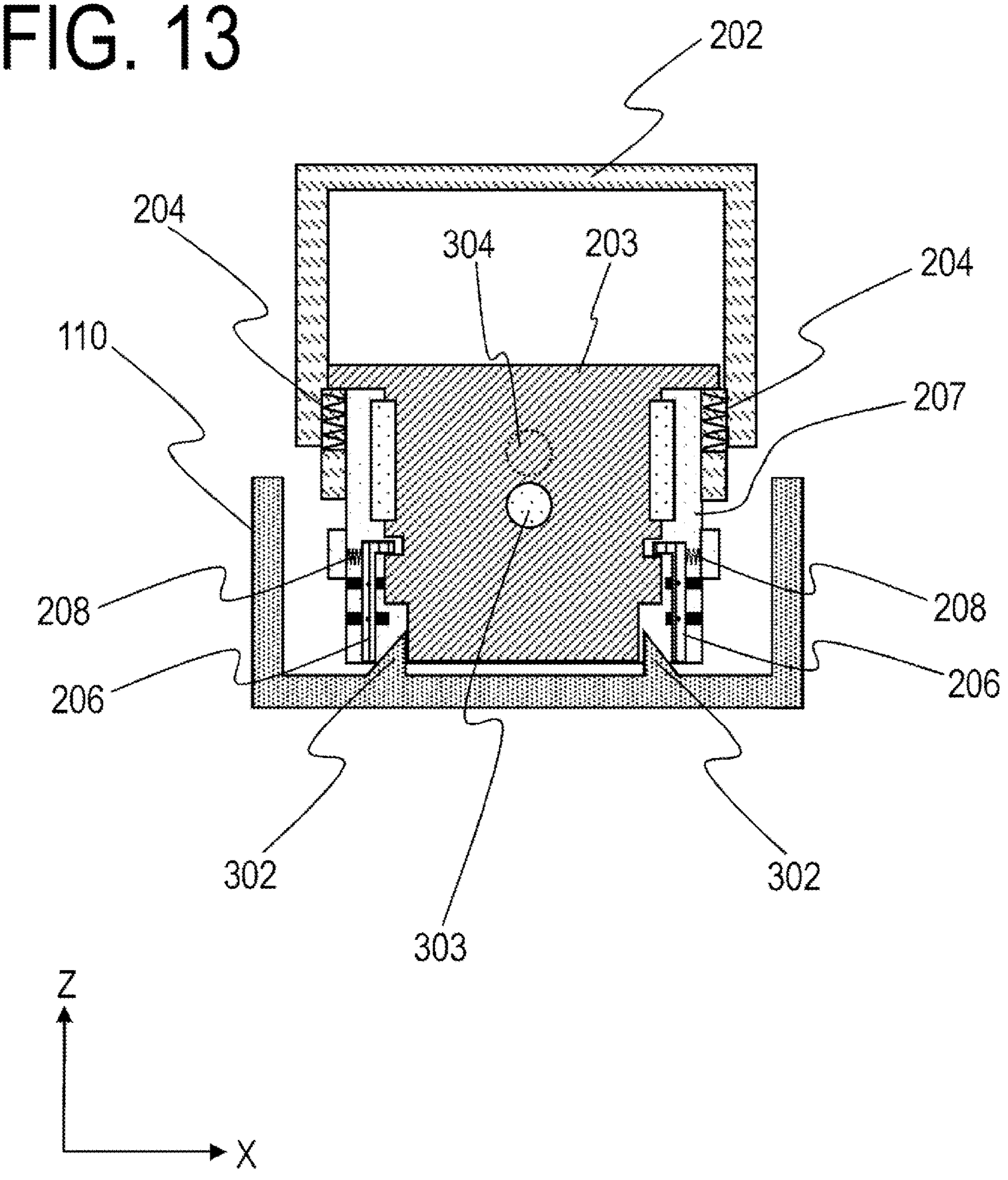
FIG. 13 is a diagram of a state in which the ink storage container is lifted.
Figure 14:
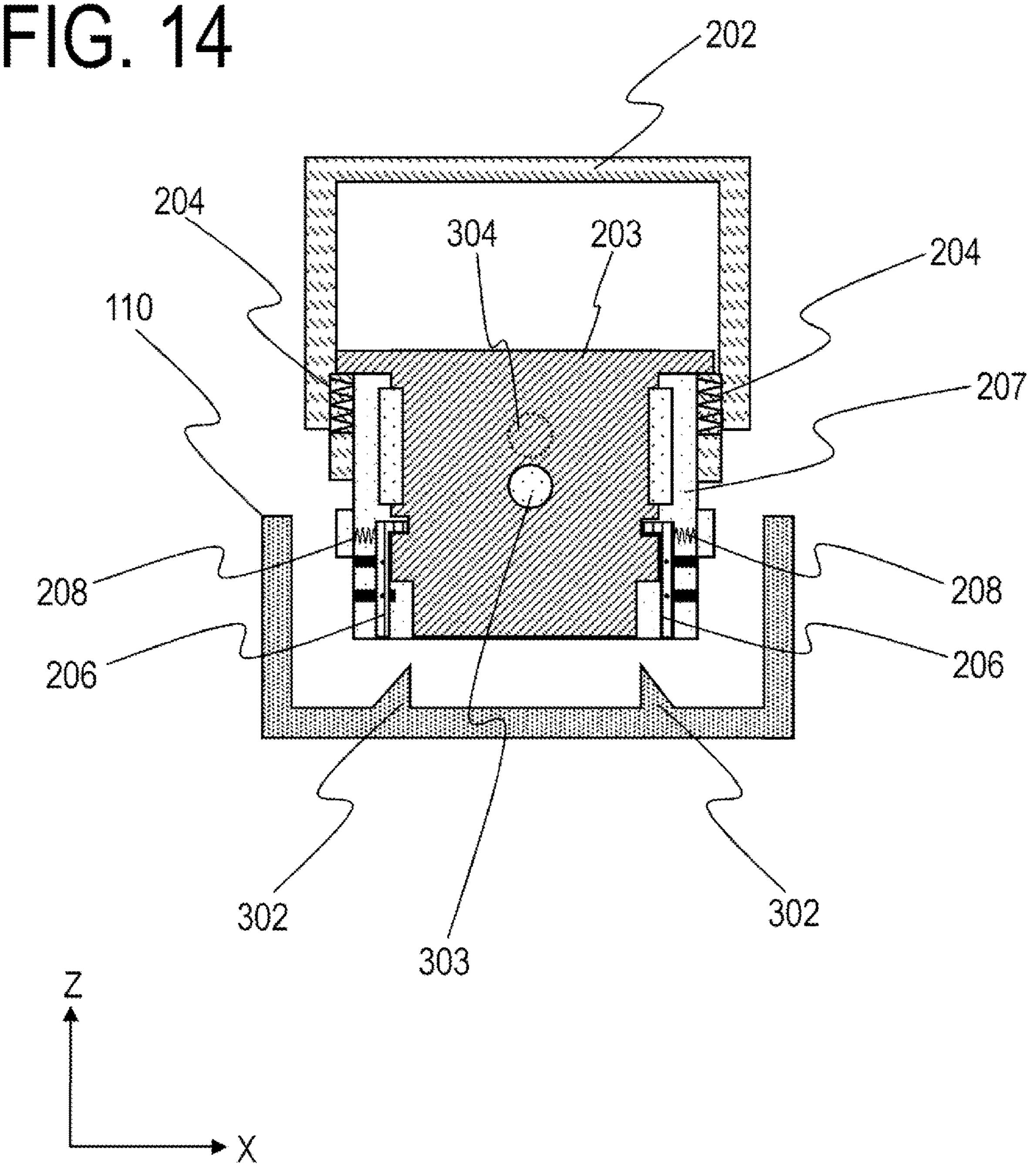
FIG. 14 is a diagram of a state in which the ink storage container is completely separated from the tray.

Referring to FIGS. 12 to 14, the movements of main parts in removing the ink storage container 111 for replacement are now described. FIG. 12 is a schematic view of a state in which the handle 202 is lifted to replace the ink storage container 111, as viewed from the ink supply port side (fragmentary view as seen in the direction of arrow C in FIG. 10).

As shown in FIG. 12, to replace the ink storage container 111, the handle 202 is lifted to provide a handhold for gripping the ink storage container 111 to remove it from the tray 110. This state (closing posture) of the handle 202 is hereinafter referred to as a removal state. The opening and closing member 203, which is attached to the ink supply portion 201 of the ink storage container 111, is coupled to the handle 202 through the springs 204. As the handle 202 is brought into the removal state, the opening and closing member 203 moves vertically downward, closing the ink supply port of the ink supply portion 201.

FIG. 13 is a schematic view of a state in which the ink storage container 111 is separated from the bottom surface of the tray 110 and the locks 206 begin to restrain the opening and closing body 203, as viewed from the ink supply port side (fragmentary view as seen in the direction of arrow C in FIG. 10). FIG. 14 is a schematic view of a state in which the ink storage container 111 is completely separated from the bottom surface of the tray 110 (a state in which the engagement releasing portions 302 completely stop acting on the locks 206) as viewed from the ink supply port side (fragmentary view as seen in the direction of arrow C in FIG. 10).

As shown in FIGS. 13 and 14, when the handle 202 is held to further lift the ink storage container 111 from the tray 110 and the ink storage container 111 is separated from the bottom surface of the tray 110, the positions at which the engagement releasing portions 302 act on the locks 206 change in a direction that weakens the restriction force. Thus, the urging forces of the springs 208 gradually move the locks 206 to the engagement position. Then, when the engagement releasing portions 302 are separated from the locks 206 so that the restriction forces on the locks 206 are removed, the locks 206 move to the engagement position in which the protruding portions 216 are fitted into the recessed portions 223 of the opening and closing body 203 and restrain the opening and closing body 203. Restraining the opening and closing body 203 closing the ink supply port with the locks 206 in this manner prevents leakage of ink from the ink storage container 111 removed for replacement and contamination resulting from ink leakage.

Referring to FIGS. 11 and 12, the movements of main parts in re-attaching the ink storage container 111 to the recording apparatus when the amount of ink remaining the ink storage container 111 is sufficient to be used again are described.

As shown in FIG. 12, when the ink storage container 111 is placed on the bottom surface of the tray 110 with the handle 202 in the removal state, the engagement releasing portions 302, which are provided on the bottom surface of the tray 110, move the locks 206 from the engagement position to the non-engagement position. That is, the engagement releasing portions 302 bring the springs 208 into a contracted state and hold the locks 206 in the non-engagement position, thereby releasing the restraint of the opening and closing body 203. When the handle 202 is brought into the housed state in this state, the handle 202 pushes up the springs 204 and simultaneously moves the opening and closing body 203 vertically upward as shown in FIG. 11. This opens the ink supply port (the ink flow holes 303 and 304) of the ink supply portion 201.

Figure 15:
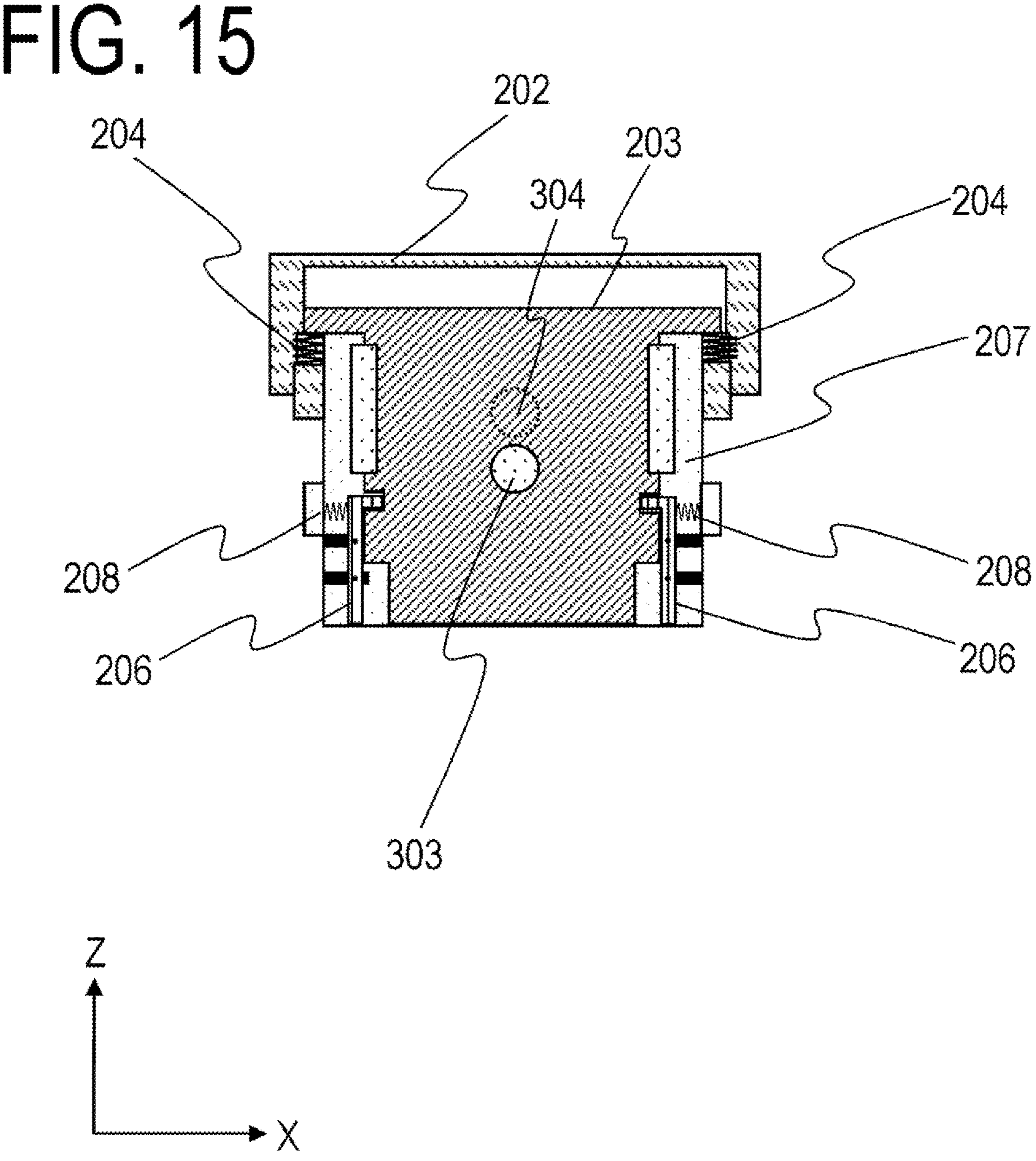
FIG. 15 is a diagram of a state in which the handle is lifted without attaching the ink storage container to the tray.

FIG. 15 is a schematic view showing a state in which the handle 202 is operated in a state in which the ink storage container 111 is not attached to the tray 110.

Bringing the handle 202 into the housed state with the ink storage container 111 unattached to the tray 110 does not move the opening and closing body 203 to the open position because the elastic urging forces of the springs 208 cause the locks 206 to restrain the opening and closing body 203. That is, the recessed portions 223 of the opening and closing body 203 are recessed in directions perpendicular to the application direction of the urging forces applied to the opening and closing body 203 by the springs 204 when the handle 202 is operated. Also, the protruding portions 216 of the locks 206 extend in directions perpendicular to the above application direction and are fitted in the recessed portions 223 in the same direction. The application directions of the urging forces of the springs 208 applied to the locks 206 are perpendicular to the application direction of the urging forces of the springs 204 applied to the opening and closing body 203. This locking structure maintains the engagement state of the locks 206 with the opening and closing body 203 regardless of any changes in the urging forces from the springs 204, thereby restraining the opening and closing body 203 in the closed position. Accordingly, in the unattached state in which the ink storage container 111 is not attached to the tray 110, any operation of the handle 202 does not open the ink supply port of the ink supply portion 201.

The operation of the ink supply portion 201 described above allows the ink storage container 111 to be removed for replacement without causing contamination due to ink leakage. Also, while allowing repeated opening and closing of the ink supply port, opening of the ink supply port is restricted in a state in which the ink storage container 111 is not attached to the recording apparatus, enabling the prevention of ink leakage and contamination in the unattached state.

Here, when the ink storage container 111 is attached to the tray 110 and the handle 202 is pressed down, the ink supply port (the ink flow holes 303 and 304) of the ink supply portion 201 communicates with the ink supply port 109 of the tray 110. An opening and closing mechanism (not shown) may seal the ink supply port 109 of the tray 110 to prevent ink leakage. That is, a configuration may be provided that prevents ink leakage from the ink supply port 109 during the period from when the ink storage container 111 is attached to the tray 110 to when the ink storage portion 105 is placed in the ink supply unit 106 and connected to the ink supply tube 107.

Also, the handle 202 may be configured so as not to exceed the height (Z direction) of the wall of the storage portion of the tray 110 when the handle 202 assumes the closing posture to place the opening and closing body 203 in the closed position, for example. The ink storage portion 105 may be configured such that the ink storage portion 105 can be placed in the ink supply unit 106 when the handle 202 is in the closing posture, that is, in a state in which the handle 202 does not protrude from the storage portion of the tray 110. That is, a configuration may be provided that ensures that the handle 202 is in the closing posture, that is, ensures that the ink supply passage (the ink flow holes 304 and 303 and the ink supply port 109) is in communication, when the ink storage portion 105 is placed in the ink supply unit 106. For example, the opening edge of the storage portion of the ink supply unit 106 for the ink storage portion 105 may be configured to come into contact with the handle 202 so as to rotate the handle 202 from the opening posture to the closing posture when the ink storage portion 105 is placed.

Furthermore, each component is preferably dimensioned so as to eliminate or minimize a gap between the ink storage container 111 and the tray 110. That is, the components may be configured such that the handle 202 is the only handhold provided for the user to attach or detach the ink storage container 111 to or from the tray 110, so that the handle 202 needs to be operated and gripped. This reduces the likelihood that the user removes the ink storage container 111 from the tray 110 without operating the handle 202 (that is, with the ink supply port open) by grasping the ink storage bag 200, for example.

Also, in the present embodiment, the springs 204 deform to contract by an opening operation of the handle 202, thereby producing urging force to move the opening and closing body 203 from the closed position to the open position. Also, the springs 204 deform to extend by a closing operation of the handle 202, thereby producing urging force to move the opening and closing body 203 from the open position to the closed position. For example, depending on how the springs 204 are connected between the handle 202 and the opening and closing body 203, the interlock configuration may cause the springs 204 to deform to extend by an opening operation of the handle 202, and cause the springs 204 to deform to contract by a closing operation of the handle 202. That is, the specific configuration of the opening and closing mechanism described herein is merely an example, and other known configurations that achieve the advantageous effects of the present invention may be used as appropriate.

Second Embodiment

Referring to FIGS. 16 to 19, a second embodiment of the present invention is now described. Here, only the features of the second embodiment that differ from the first embodiment are described. The features of the second embodiment that are not specifically described are the same as those in the first embodiment.

Figure 16:
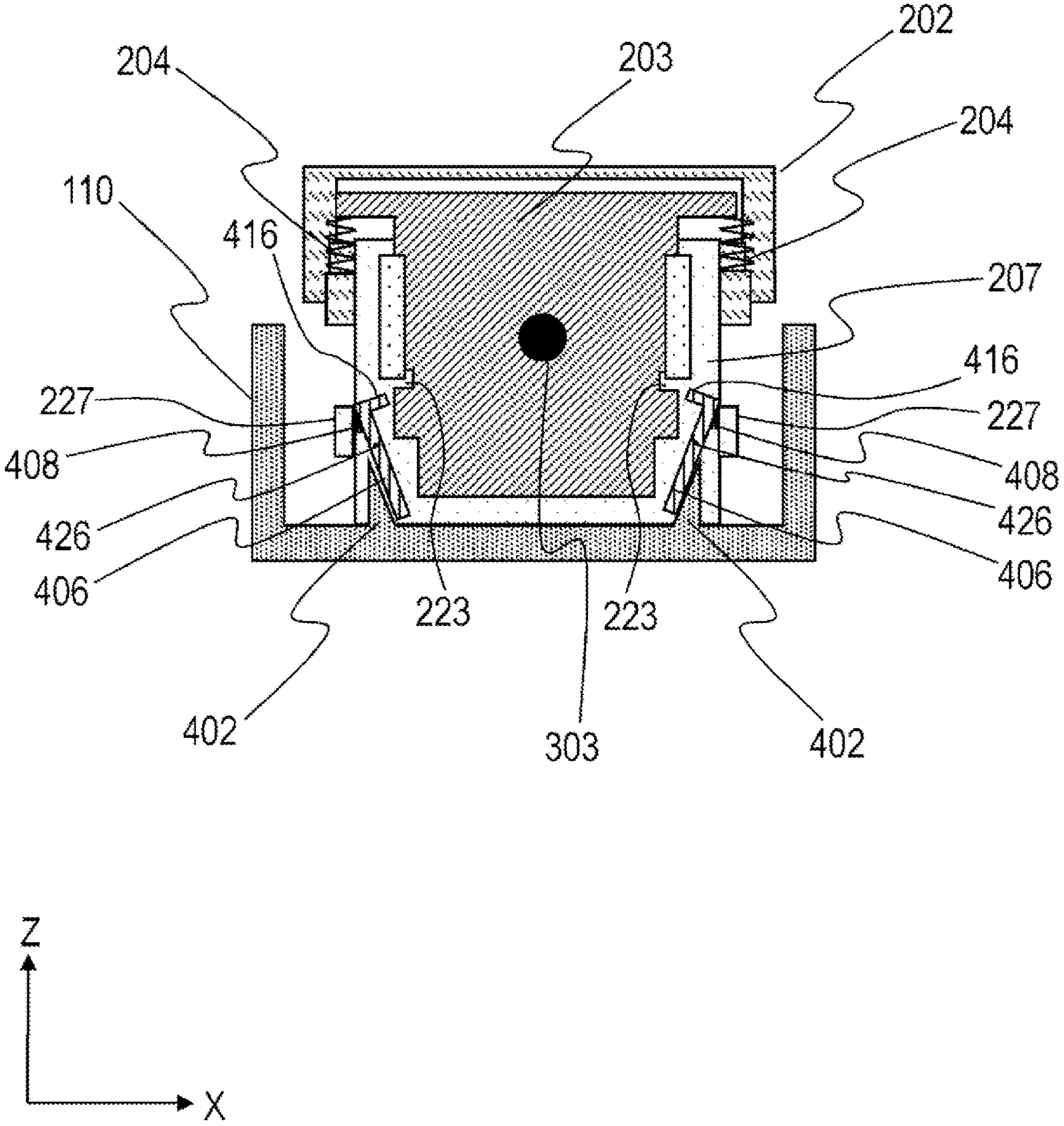
FIG. 16 is a diagram of a state in which an ink storage container of a second embodiment is attached to a tray.

FIG. 16 is a schematic view showing an ink storage container 111 according to the second embodiment as viewed from the ink supply port side. In the second embodiment, locks 406 for restricting movement of the opening and closing body 203 differ in configuration from the locks 206 in the first embodiment. That is, each lock 406 of the second embodiment is rotationally supported at one point with respect to the connection member 207 and is configured to restrict and open the opening and closing body 203 in arc motions. The lock 406 is coupled to the connection member 207 so as to be rotatable about a rotation axis 426 in the Y direction perpendicular to the sliding directions of the opening and closing body 203.

In the same manner as the engagement releasing portions 302 of the first embodiment, engagement releasing portions 402 are configured to come into contact with the locks 406 and release the locked state of the opening and closing body 203 by the locks 406 during the process of attaching the ink storage container 111 to the tray 110. That is, each engagement releasing portion 402 is configured to apply, to the corresponding lock 406, a force that moves the lock 406 from the engagement position, in which the protruding portion 416 as the engagement portion of the lock 406 is fitted in the recessed portion 223 of the opening and closing body 203, to the non-engagement position, in which engagement of the protruding portion 416 is released from the recessed portion 223.

As a specific configuration of the engagement releasing portion 402, a cam plate structure is used that includes an inclined surface that is inclined with respect to the X direction and the Z direction as shown FIG. 16, for example. The engagement releasing portion 402 rotates the lock 406 in a direction that removes the protruding portion 416 from the recessed portion 223 of the opening and closing body 203 by pressing a section of the lock 406 on the opposite side of the rotation center of the lock 406 (rotation axis 426) from the protruding portion 416 as the engagement portion.

The shaft support portion serving as the rotation center of the lock 406 is preferably located vertically above the apex of the engagement releasing portion 402 when housed in the tray 110. The engagement releasing portion 402 of the tray 110 has an inclined side that defines the posture of the lock 406 when the ink storage container 111 is housed in the tray 110. This inclined side differs in posture from the inclined side of the engagement releasing portion 302 of the first embodiment.

As shown in FIG. 16, in this embodiment, when the ink storage container 111 is housed in the tray 110, the lock 406 is held in an inclined posture along the inclined side of the engagement releasing portion 402, so that the opening and closing body 203 can open the ink supply port.

Figure 17:
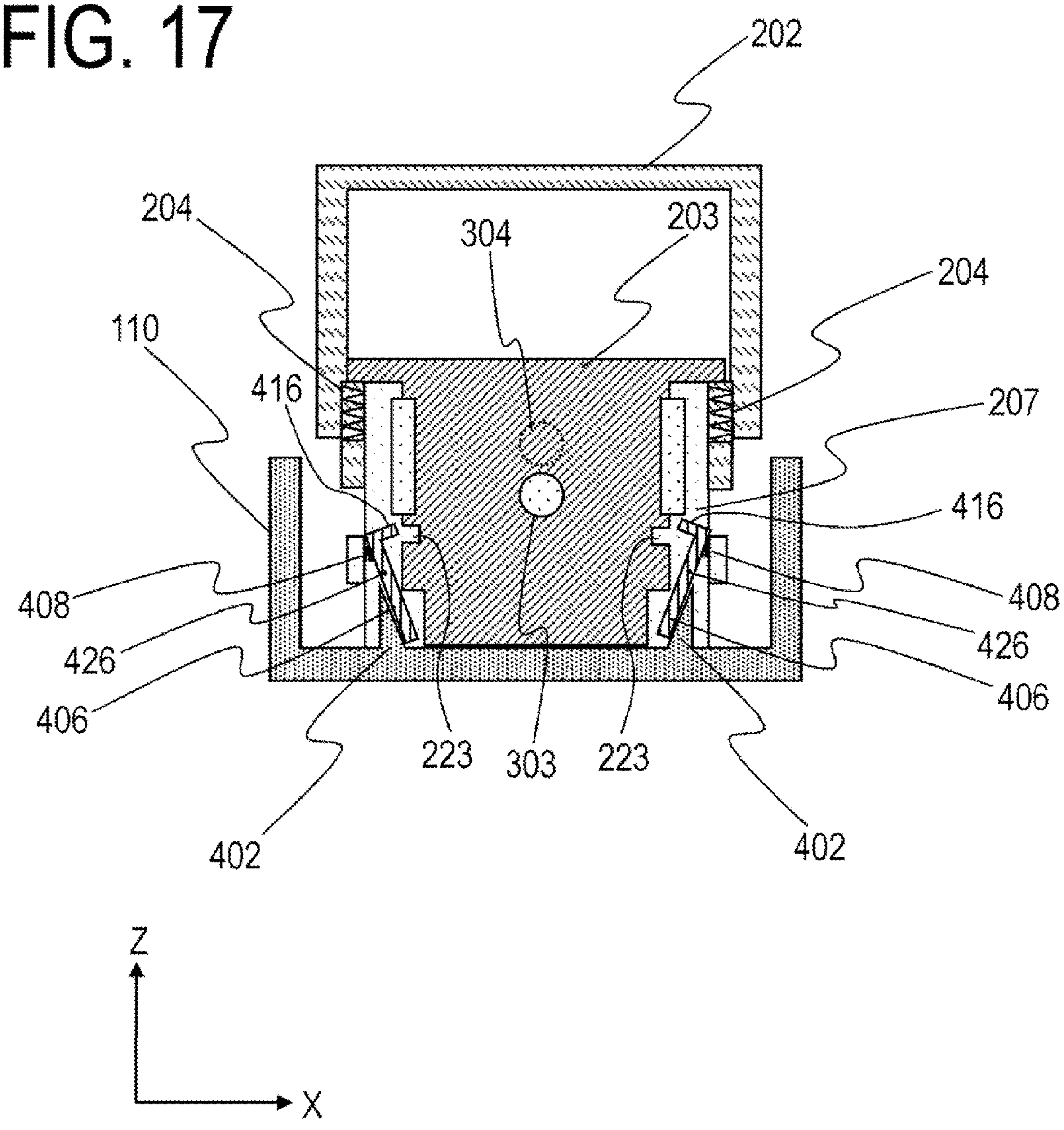
FIG. 17 is a diagram of a state in which the handle is lifted.

FIG. 17 is a schematic view of a state in which the handle 202 is lifted to replace the ink storage container 111 of the second embodiment as viewed from the ink supply port side.

As shown in FIG. 17, also in the present embodiment, to replace the ink storage container 111, the handle 202 is lifted to the removal state to provide a handhold for gripping the ink storage container 111 to remove it from the tray 110 as in the first embodiment. The opening and closing body 203, which is attached to the ink supply portion 201 of the ink storage container 111, is coupled to the handle 202 through the springs 204. As the handle 202 is brought into the removal state, the opening and closing body 203 moves vertically downward, closing the ink supply port of the ink supply portion 201.

Figure 18:
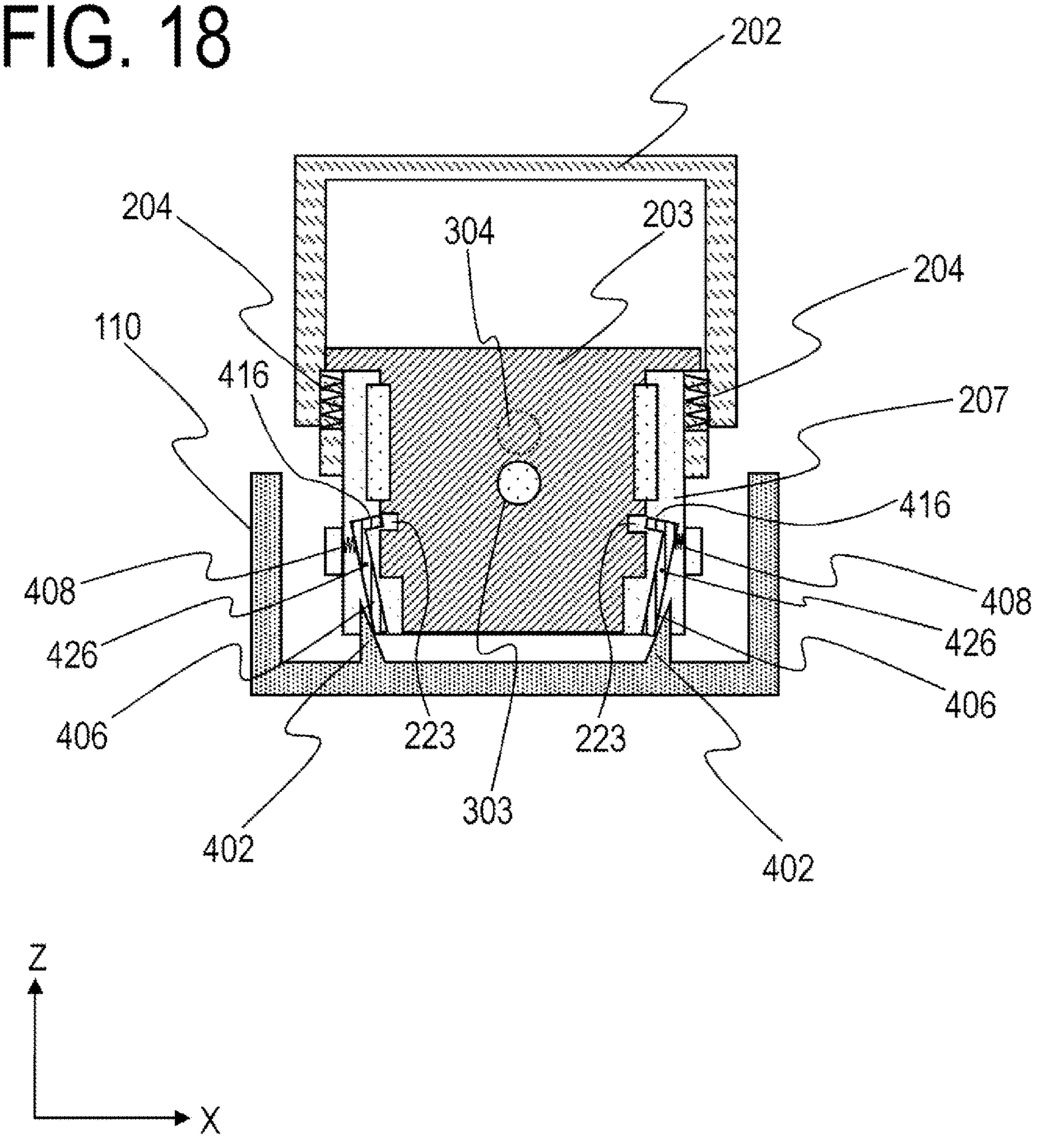
FIG. 18 is a diagram of a state in which the ink storage container is lifted.
Figure 19:
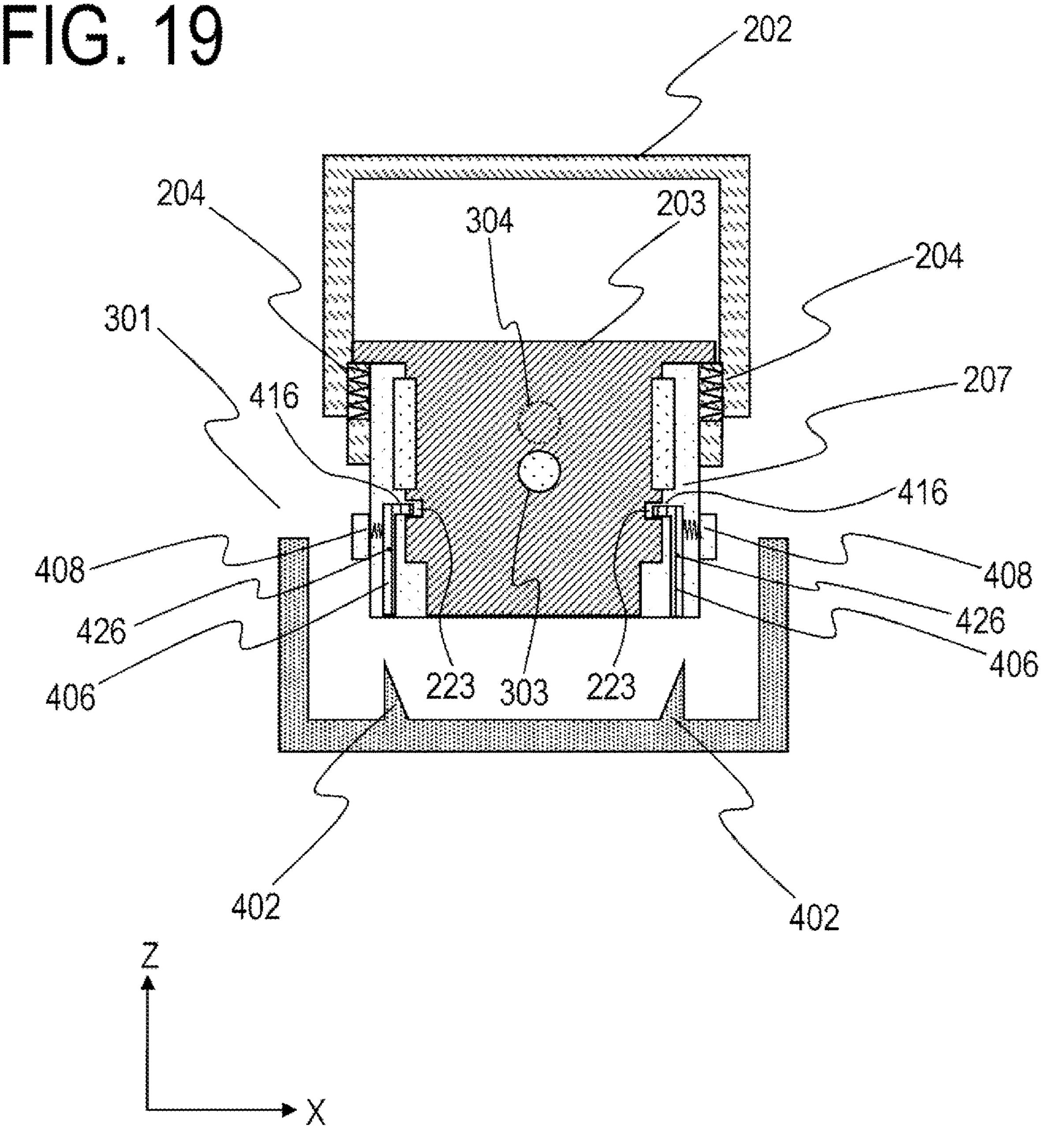
FIG. 19 is a diagram of a state in which the ink storage container is completely separated from the tray.

FIG. 18 is a schematic view of a state in which the ink storage container 111 of the second embodiment is separated from the bottom surface of the tray 110 and the locks 406 begin to restrain the opening and closing body 203, as viewed from the ink supply port side. FIG. 19 is a schematic view of a state in which the ink storage container 111 of the second embodiment is completely separated from the bottom surface of the tray 110 (a state in which the engagement releasing portions 402 completely stop acting on the locks 406) as viewed from the ink supply port side.

As shown in FIGS. 18 and 19, when the handle 202 is held to further lift the ink storage container 111 from the tray 110 and the ink storage container 111 is separated from the bottom surface of the tray 110, the positions at which the engagement releasing portions 402 act on the locks 406 change in a direction that weakens the restriction force. As a result, the urging force of each spring 408 gradually moves the corresponding lock 406 to the engagement position along an arc track with one point at which lock 406 is supported by the connection member 207 serving as the rotation center. Then, when the engagement releasing portions 402 are separated from the locks 406 so that the restriction forces on the locks 406 are removed, the locks 406 move to the engagement position in which the protruding portions 416 are fitted into the recessed portions 223 of the opening and closing body 203 and restrain the opening and closing body 203 to limit its movement.

In also the present embodiment, the operation of the ink supply portion 201 allows the ink storage container 111 to be removed for replacement without causing contamination due to ink leakage as described above. Also, while allowing repeated opening and closing of the ink supply port, opening of the ink supply port is restricted in a state in which the ink storage container 111 is not attached to the recording apparatus, enabling the prevention of ink leakage and contamination in the unattached state.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-115189, filed on Jul. 20, 2022, which is hereby incorporated by reference herein in its entirety.

What is claimed is:

1. A liquid storage container attachable to and detachable from a recording apparatus that performs recording by ejecting liquid onto a recording material, the liquid storage container comprising:

a liquid storage bag that includes a supply port for supplying liquid to a port to be supplied of the recording apparatus, is configured to store liquid, and is made of a flexible film;

an opening and closing body movable between an open position that allows liquid to be supplied from the supply port to the port to be supplied and a closed position that closes the supply port;

a handle configured to move the opening and closing body between the open position and the closed position; and a lock mechanism configured to lock the opening and closing body in the closed position so as to permit the opening and closing body to move to the open position only in a case where the liquid storage container is in an attached state in which the liquid storage container is attached to the recording apparatus.

2. The liquid storage container according to claim 1, wherein the opening and closing body is configured to while the liquid storage container is in the attached state, be in a state in which the opening and closing body is movable between the open position and the closed position by an operation of the handle, and while the liquid storage container is in an unattached state in which the liquid storage container is not attached to the recording apparatus, be restricted by the lock mechanism from moving from the closed position to the open position even in a case where the handle is operated.

3. The liquid storage container according to claim 1, wherein the opening and closing body and the handle are connected through an elastic member that is deformable to extend and contrast, wherein the opening and closing body includes an engaged portion, wherein the lock mechanism includes:

an engagement member movable to an engagement position in which the engagement member engages with the engaged portion so as to restrict movement of the opening and closing body from the closed position to the open position, and to a non-engagement position in which the engagement member does not engage with the engaged portion; and an urging member configured to urge the engagement member so as to position the engagement member in the engagement position, and wherein the engagement member is configured to in a case where the liquid storage container is attached to the recording apparatus, be moved by an engagement releasing portion disposed in the recording apparatus from the engagement position to the non-engagement position, and while the liquid storage container is in the attached state, be locked in the non-engagement position by the engagement releasing portion.

4. The liquid storage container according to claim 3, wherein the elastic member is configured to deform to contract or deform to extend by an operation of the handle so as to produce urging force that moves the opening and closing body, and is coupled between the opening and closing body and the handle such that the elastic member has a natural length that does not produce the urging force while the opening and closing body is in the closed position and the handle is in a closing posture and while the opening and closing body is in the open position and the handle is in an opening posture.

5. The liquid storage container according to claim 3, wherein the engaged portion is a recessed portion that is recessed in a perpendicular direction perpendicular to an application direction of urging force applied to the opening and closing body by the elastic member, and wherein the engagement member includes a protruding portion that extends in the perpendicular direction and is fitted in the recessed portion in the engagement position.

6. The liquid storage container according to claim 3, wherein an application direction of urging force applied to the engagement member by the urging member is perpendicular to an application direction of urging force applied to the opening and closing body by the elastic member.

7. The liquid storage container according to claim 3, wherein the liquid storage container includes a connection member that is integral with the liquid storage bag and forms the supply port, wherein the opening and closing body is coupled to the connection member so as to be movable between the open position and the closed position, wherein the handle is rotationally coupled to the connection member, wherein the engagement member is coupled to the connection member so as to be movable between the engagement position and the non-engagement position, and wherein the urging member is coupled between the connection member and the engagement member.

8. The liquid storage container according to claim 1, wherein the opening and closing body has a communication hole to provide communication between the port to be supplied and the supply port, and wherein the communication hole communicates with the supply port in a case where the opening and closing body is in the open position, and does not communicate with the supply port in a case where the opening and closing body is in the closed position.

9. A recording apparatus comprising:

an apparatus main body including a recording portion configured to perform recording by ejecting liquid onto a recording material; and a liquid storage container that is attachable to and detachable from the apparatus main body, wherein the apparatus main body includes a port to be supplied for receiving supply of liquid from the liquid storage container, and wherein the liquid storage container includes:

a liquid storage bag that includes a supply port for supplying liquid to the port to be supplied, is configured to store liquid, and is made of a flexible film;

an opening and closing body movable between an open position that allows liquid to be supplied from the supply port to the port to be supplied and a closed position that closes the supply port;

a handle configured to move the opening and closing body between the open position and the closed position; and a lock mechanism configured to lock the opening and closing body in the closed position so as to permit the opening and closing body to move to the open position only in a case where the liquid storage container is in an attached state in which the liquid storage container is attached to the recording apparatus.

10. The recording apparatus according to claim 9, wherein the opening and closing body is configured to while the liquid storage container is in the attached state, be in a state in which the opening and closing body is movable between the open position and the closed position by an operation of the handle, and while the liquid storage container is in an unattached state in which the liquid storage container is not attached to the recording apparatus, be restricted by the lock mechanism from moving from the closed position to the open position even in a case where the handle is operated.

11. The recording apparatus according to claim 9, wherein the opening and closing body and the handle are connected through an elastic member that is deformable to extend and contrast, wherein the opening and closing body includes an engaged portion, wherein the lock mechanism includes:

an engagement member movable to an engagement position in which the engagement member engages with the engaged portion so as to restrict movement of the opening and closing body from the closed position to the open position, and to a non-engagement position in which the engagement member does not engage with the engaged portion; and an urging member configured to urge the engagement member so as to position the engagement member in the engagement position, and wherein the apparatus main body includes an engagement releasing portion configured to, in a case where the liquid storage container is attached to the apparatus main body, move the engagement member from the engagement position to the non-engagement position, and to, while the liquid storage container is in the attached state, lock the engagement member in the non-engagement position.

12. The recording apparatus according to claim 11, wherein the elastic member is configured to deform to contract or deform to extend by an operation of the handle so as to produce urging force that moves the opening and closing body, and is coupled between the opening and closing body and the handle such that the elastic member has a natural length that does not produce the urging force while the opening and closing body is in the closed position and the handle is in a closing posture and while the opening and closing body is in the open position and the handle is in an opening posture.

13. The recording apparatus according to claim 11, wherein the engaged portion is a recessed portion that is recessed in a perpendicular direction perpendicular to an application direction of urging force applied to the opening and closing body by the elastic member, and wherein the engagement member includes a protruding portion that extends in the perpendicular direction and is fitted in the recessed portion in the engagement position.

14. The recording apparatus according to claim 11, wherein an application direction of urging force applied to the engagement member by the urging member is perpendicular to an application direction of urging force applied to the opening and closing body by the elastic member.

15. The recording apparatus according to claim 11, wherein the recording apparatus includes a connection member that is integral with the liquid storage bag and forms the supply port, wherein the opening and closing body is coupled to the connection member so as to be movable between the open position and the closed position, wherein the handle is rotationally coupled to the connection member, wherein the engagement member is coupled to the connection member so as to be movable between the engagement position and the non-engagement position, and wherein the urging member is coupled between the connection member and the engagement member.

16. The recording apparatus according to claim 11, wherein the apparatus main body includes a tray having a storage portion that stores the liquid storage container, and wherein the engagement releasing portion is disposed at a bottom surface of the storage portion of the tray.

17. The recording apparatus according to claim 9, wherein the opening and closing body has a communication hole to provide communication between the port to be supplied and the supply port, and wherein the communication hole communicates with the supply port in a case where the opening and closing body is in the open position, and does not communicate with the supply port in a case where the opening and closing body is in the closed position.

* * * * *